(12) United States Patent
Komori et al.

(10) Patent No.: US 7,758,994 B2
(45) Date of Patent: Jul. 20, 2010

(54) NICKEL METAL HYDRIDE STORAGE BATTERY WITH A SAFETY VALVE FOR RELIEVING EXCESS GAS PRESSURE IN THE BATTERY WHEN THE SAFETY VALVE IS OPEN, THE SAFETY VALVE HAVING A HYDROGEN-PERMEABLE VALVE MEMBER FOR ALLOWING HYDROGEN-GAS LEAKAGE THERETHROUGH WHEN THE SAFETY VALVE IS CLOSED

(75) Inventors: Katsunori Komori, Toyohashi (JP); Tomohiro Matsuura, Toyota (JP); Shinji Hamada, Toyohashi (JP); Toyohiko Eto, Toyota (JP); Yoshiyuki Nakamura, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 139 days.

(21) Appl. No.: 11/629,981

(22) PCT Filed: Jun. 29, 2005

(86) PCT No.: PCT/JP2005/012445

§ 371 (c)(1),
(2), (4) Date: Dec. 19, 2006

(87) PCT Pub. No.: WO2006/004145

PCT Pub. Date: Jan. 12, 2006

(65) Prior Publication Data

US 2008/0096096 A1    Apr. 24, 2008

(30) Foreign Application Priority Data

Jul. 2, 2004    (JP) .............................. 2004-196777

(51) Int. Cl.
*H01M 2/12* (2006.01)
*H01M 2/08* (2006.01)
(52) U.S. Cl. .............................. 429/53; 429/54; 429/185
(58) Field of Classification Search .................... 429/56
See application file for complete search history.

(56) References Cited

U.S. PATENT DOCUMENTS 4,581,304 A    4/1986 Beatty et al.
(Continued)

FOREIGN PATENT DOCUMENTS

EP    0 118 609    9/1984
(Continued)

OTHER PUBLICATIONS

Derwent Abstract for Terada et al., JP 02-288064 A.*
(Continued)

*Primary Examiner*—Dah-Wei D Yuan
*Assistant Examiner*—Edu E Enin-Okut
(74) *Attorney, Agent, or Firm*—Finnegan, Henderson, Farabow, Garrett & Dunner, LLP

(57) ABSTRACT

A nickel-metal hydride storage battery is provided capable of suppressing changes in discharge reserve and charge reserve of a negative electrode to prevent lowering of battery characteristics for a long term. A nickel-metal hydride storage battery 100 of the present invention comprises a battery main part (an electrode plate group 150, an electrolyte, and others), a case 102 housing this battery main part, and a safety valve device 101. The safety valve device 101 includes a valve member 110 of a closed-end substantially cylindrical shape. This nickel-metal hydride storage battery 100 is arranged such that a hydrogen leak rate $V1(\mu l/h/Ah)$ of the battery having been charged and discharged and then charged to 60% SOC satisfies a relationship: $2 \leq V1 \leq 4$, the hydrogen leak rate being per unit of battery capacity under an atmosphere at a battery temperature of 45° C., and a reduced pressure of 10 kPa.

12 Claims, 16 Drawing Sheets

FOREIGN PATENT DOCUMENTS

| | | |
|---|---|---|
| EP | 1 130 668 A1 | 9/2001 |
| JP | 59160955 A * | 9/1984 |
| JP | 02-288064 * | 11/1990 |
| JP | 08-031398 | 2/1996 |
| JP | 08-148135 | 6/1996 |
| JP | 09-283106 | 10/1997 |
| JP | 11111255 A * | 4/1999 |
| JP | 11-339747 | 12/1999 |
| JP | 2004-039582 | 2/2004 |

U.S. PATENT DOCUMENTS

| | | | |
|---|---|---|---|
| 5,264,301 A * | 11/1993 | Sindorf et al. | 429/53 |
| 5,472,802 A * | 12/1995 | Holland et al. | 429/54 |
| 5,501,917 A * | 3/1996 | Hong | 429/101 |
| 5,554,455 A * | 9/1996 | Inoue et al. | 429/53 |
| 5,712,056 A * | 1/1998 | Matsumasa et al. | 429/54 |
| 5,804,334 A * | 9/1998 | Yamamura et al. | 429/218.1 |
| 5,912,090 A | 6/1999 | Nagai et al. | |
| 6,491,176 B1 * | 12/2002 | Schollenberger et al. | 215/307 |
| 6,528,202 B1 * | 3/2003 | Arai et al. | 429/54 |
| 2004/0086779 A1 | 5/2004 | Higley et al. | |
| 2004/0191619 A1 | 9/2004 | Komori et al. | |

OTHER PUBLICATIONS

Supplementary European Search Report dated Sep. 3, 2007.
XP-002445353, "Nickel Metal Hydride Batteries: Individual Data Sheet," *Nickel Metal Hydride Handbook*, Panasonic, Aug. 2005.
International Search Report.

* cited by examiner

NICKEL METAL HYDRIDE STORAGE BATTERY WITH A SAFETY VALVE FOR RELIEVING EXCESS GAS PRESSURE IN THE BATTERY WHEN THE SAFETY VALVE IS OPEN, THE SAFETY VALVE HAVING A HYDROGEN-PERMEABLE VALVE MEMBER FOR ALLOWING HYDROGEN-GAS LEAKAGE THERETHROUGH WHEN THE SAFETY VALVE IS CLOSED

TECHNICAL FIELD

The present invention relates to a nickel-metal hydride storage battery.

BACKGROUND ART

In recent years, various types of nickel-metal hydride storage batteries have been proposed as power sources for portable devices or equipment or power sources for electric vehicles or hybrid electric vehicles. In such nickel-metal hydride storage batteries, a resin case made of resin or a metal case made of metal is used as a case (a battery casing) (refer to e.g. Patent documents 1 and 2).

Patent document 1: Japanese unexamined patent publication No. 8-148135 (1996)

Patent document 2: Japanese unexamined patent publication No. 8-31398 (1996)

The nickel-metal hydride storage battery is normally designed to have a negative electrode capacity larger than a positive electrode capacity. Accordingly, the discharge capacity of the battery is regulated by the positive electrode capacity (hereinafter, referred to as a "positive electrode capacity regulation"). This positive electrode regulation makes it possible to suppress an increase in internal pressure during overcharging or overdischarging. It is to be noted that an excess capacity of a negative electrode available for charge is referred to as charge reserve and an excess capacity of the negative electrode available for discharge is referred to as discharge reserve.

DISCLOSURE OF INVENTION

Problems to be Solved by the Invention

Meanwhile, in the nickel-metal hydride storage battery, the hydrogen absorbing alloy of a negative electrode tends to corrode due to repeated use, causing a side reaction that the hydride absorbing alloy will absorb hydrogen. In the nickel-metal hydride storage battery, particularly including a metal case, accordingly, the hydrogen absorption amount of the hydrogen absorbing alloy gradually increases. As a result, the discharge reserve of the negative electrode increases while the charge reserve decreases, leading to a rise in the internal pressure in the battery during charging. Long-term use will cause the charge reserve to run short, which results in the generation of a large amount of hydrogen gas or the like from the negative electrode, elevating the internal pressure in the battery in for example a fully charged state. Thus, a safety valve will open to release hydrogen gas from the battery to suppress excessive rise in the internal pressure. However, since the released hydrogen gas was generated from the electrolyte, a decrease in amount of the electrolyte is caused, leading to very lowering of battery characteristics. The nickel-metal hydride storage battery having the metal case has problems as above with the lowering of battery characteristics resulting from long-term corrosion of the hydrogen absorbing alloy. In the case where such battery is used as a power source of an electric vehicle or hybrid electric vehicle requiring a battery life of more than ten years, the above lowering of battery characteristics would be seriously problematic.

In the nickel-metal hydride storage battery having the resin case, on the other hand, a small amount of hydrogen gas is allowed to continuously leak out by permeating through the resin case. When the hydrogen gas leaks out of the battery, accordingly, the hydrogen absorbing alloy of the negative electrode will release hydrogen according to the hydrogen leakage amount in order to keep balance of hydrogen partial pressure in the case. This decreases the discharge reserve of the negative electrode. Thus, due to long-term use, the relationship between the positive electrode capacity and the negative electrode capacity becomes out of balance, and the negative electrode capacity decreases and the discharge reserve runs short. As a result, the nickel-metal hydride storage battery is regulated by the negative electrode capacity (which means that the discharge capacity of the battery is regulated depending on the negative electrode capacity). This results in a decrease in the discharge capacity. In the nickel-metal hydride storage battery having the resin case as above, the battery characteristics tend to remarkably lower due to long-term leakage of hydrogen gas. In the case where such battery is used as a power source of an electric vehicle or hybrid electric vehicle requiring a battery life of more than ten years, the above lowering of battery characteristics would be seriously problematic.

The present invention has been made in view of the above circumstances and has an object to provide a nickel-metal hydride storage battery capable of suppressing changes in discharge reserve and charge reserve of a negative electrode to thereby prevent lowering of battery characteristics for a long term.

Means for Solving the Problems

To solve the above problems, the present invention provides a nickel-metal hydride storage battery comprising: a battery main part; and a case which houses the battery main part; wherein the battery is adapted to provide, after charging and discharging and charged to 60% SOC, a hydrogen leak rate V1 ($\mu$l/h/Ah) per unit of battery capacity that satisfies a relationship; $2 \leq V1 \leq 14$ under an atmosphere at a battery temperature of 45° C. and a reduced pressure of 10 kPa.

The nickel-metal hydride storage battery of the present invention is arranged such that the hydrogen leak rate V1 ($\mu$l/h/Ah) per unit of battery capacity at 60% SOC and a battery temperature of 45° C. under an atmosphere of a reduced pressure of 10 kPa satisfies the relationship: $2 \leq V1 \leq 14$. When the hydrogen leak rate V1 is determined in such range, the reducing amount of hydrogen resulting from leakage of hydrogen gas out of the battery and the increasing amount of hydrogen in the battery resulting from corrosion of the hydrogen absorbing alloy of the negative electrode can be kept in balance. This makes it possible to suppress changes in charge reserve and discharge reserve of the negative electrode, thereby preventing lowering of battery characteristics for a long term.

The battery main part is disposed in the case for providing a battery function and includes for example an electrode, a separator, an electrolyte, and others. The SOC stands for State of Charge.

Further, in the above nickel-metal hydride storage battery, preferably, the hydrogen leak rate V1 ($\mu$l/h/Ah) satisfies a relationship: $3.5 \leq V1 \leq 10$.

The nickel-metal hydride storage battery of the present invention is arranged such that the hydrogen leak rate V1 (μl/h/Ah) satisfies the relationship: $3.5 \leq V1 \leq 10$. Determining the hydrogen leak rate V1 in such range makes it possible to suppress changes in charge reserve and discharge reserve of the negative electrode and prevent the battery characteristics from lowering for a longer term.

According to another aspect, the present invention provides a nickel-metal hydride storage battery comprising: a battery main part; and a case which houses the battery main part; wherein the battery is adapted to provide, after charging and discharging and charged to 60% SOC, a hydrogen leak rate V2 (μl/h/cm³) per unit of battery volume that satisfies a relationship: $0.2 \leq V2 \leq 1.8$ under an atmosphere at a battery temperature of 45° C., and a reduced pressure of 10 kPa.

The nickel-metal hydride storage battery of the present invention is arranged such that the hydrogen leak rate V2 (μl/h/cm³) per unit of battery volume at 60% SOC, a battery temperature of 45° C. under an atmosphere of a reduced pressure of 10 kPa satisfies the relationship: $0.2 \leq V2 \leq 1.8$. When the hydrogen leak rate V2 is determined in such range, the decreasing amount of hydrogen resulting from leakage of hydrogen gas out of the battery and the increasing amount of hydrogen in the battery resulting from corrosion of the hydrogen absorbing alloy of the negative electrode can be kept in balance. This makes it possible to suppress changes in charge reserve and discharge reserve of the negative electrode, thereby preventing lowering of battery characteristics for a long term.

The battery volume represents the inner volume of the case. Further, the battery main part is disposed in the case for providing a battery function and includes for example an electrode, a separator, an electrolyte, and others. The SOC stands for State of Charge.

Further, in the above nickel-metal hydride storage battery, preferably, the hydrogen leak rate V2 (μl/h/cm³) satisfies a relationship: $0.4 \leq V2 \leq 1.1$.

The nickel-metal hydride storage battery of the present invention is arranged such that the hydrogen leak rate V2 (μl/h/cm³) satisfies the relationship: $0.4 \leq V2 \leq 1.1$. Determining the hydrogen leak rate V2 in such range makes it possible to suppress changes in charge reserve and discharge reserve of the negative electrode and thus prevent the battery characteristics from lowering for a longer term.

Further, in the above nickel-metal hydride storage battery, preferably, the case includes a metal wall made of metal, and the area of the metal wall forming an outer surface of the case exceeds 90% of a total area of the outer surface of the case.

The nickel-metal hydride storage battery of the present invention is arranged such that the case includes the metal wall in an area of more than 90% of the total area of the outer surface of the case. Such case made of metal in an area more than 90% can attain an excellent cooling property of the battery to prevent excessive rise in battery temperature.

Meanwhile, in conventional nickel-metal hydride batteries provided with such case principally made of metal, it is difficult to allow hydrogen gas in the case to permeate through the wall of the case smoothly. This would cause a gradual increase in the hydrogen storage amount of the hydrogen absorbing alloy as corrosion of the hydrogen absorbing alloy of the negative electrode occurs. In consequence, the discharge reserve of the negative electrode would increase, whereas the charge reserve gradually would decrease, leading to lowering of the battery characteristics. In the nickel-metal hydride storage battery of the present invention, on the other hand, the hydrogen leak rate V1 or V2 is determined at a value in a predetermined range as described above. Even when the case is principally made of metal as above, therefore, changes in discharge reserve and charge reserve of the negative electrode can be suppressed and thus the lowering of the battery characteristics can be prevented for a long term.

Further, in the above nickel-metal hydride storage battery, the case is preferably made of metal.

In the nickel-metal hydride storage battery of the present invention, the case is made of metal. This makes it possible to achieve an excellent cooling property of the battery, preventing excessive rise in battery temperature.

Meanwhile, in conventional nickel-metal hydride batteries provided with a case principally made of metal, it is difficult to allow hydrogen gas in the case to permeate through a wall of the case smoothly. Accordingly, the discharge reserve of the negative electrode would increase, whereas the charge reserve gradually would decrease, leading to lowering of the battery characteristics. In the nickel-metal hydride storage battery of the present invention, on the other hand, the hydrogen leak rate V1 or V2 is determined at a value in a predetermined range as described above. Even when the case is made of metal, therefore, changes in discharge reserve and charge reserve of the negative electrode can be suppressed and thus the lowering of the battery characteristics can be prevented for a long term.

Further, it is preferable that the above nickel-metal hydride storage battery further comprises a hydrogen leakage device for allowing hydrogen gas in the case to leak out of the battery.

The nickel-metal hydride storage battery of the present invention includes the hydrogen leakage device for allowing hydrogen gas to leak from the case to the outside of the battery. Controlling the hydrogen leak rate by the hydrogen leakage device can adjust the hydrogen leak rate of the entire battery. In other words, when the hydrogen leak rate of the hydrogen leakage device is controlled appropriately, the hydrogen leak rate V1 (μl/h/Ah) of the entire battery can be adjusted to $2 \leq V1 \leq 14$. Alternatively, when the hydrogen leak rate of the hydrogen leakage device is controlled appropriately, the hydrogen leak rate V2 (μl/h/cm³) of the entire battery can be adjusted to $0.2 \leq V2 \leq 1.8$. Consequently, changes in discharge reserve and charge reserve of the negative electrode can be suppressed and thus the lowering of the battery characteristics can be prevented for a long term.

The hydrogen leakage device may include for example a structure containing hydrogen permeable resin (rubber). Since the nickel-metal hydride storage battery uses the alkaline electrolyte, in particular, a hydrogen permeable resin (rubber) (e.g. EPDM) having a high resistance to alkali is preferably adopted. This hydrogen leakage device may be provided independently from the safety valve device or the safety valve device may also be used as the hydrogen leakage device. Alternatively, the hydrogen leakage device may be independently provided and the safety valve device may also be used as the hydrogen leakage device.

Further, it is preferable that the above nickel-metal hydride storage battery, further comprises a safety valve device for releasing gas from the case when an internal pressure in the case exceeds a predetermined value to prevent excessive rise in the internal pressure in the case, and the safety vale device is also used as the hydrogen leakage device.

In the nickel-metal hydride storage battery of the present invention, the safety valve device is also used as the hydrogen leakage device. Specifically, the safety valve device has an excessive pressure preventing function for preventing excessive rise in inner pressure in the case and also a hydrogen leakage function for allowing hydrogen gas in the case to leak out of the battery. Therefore, controlling the hydrogen leak rate with the safety valve device can adjust the hydrogen leak rate of the entire battery.

A configuration that the safety valve device is also used as the hydrogen leakage device may include a configuration that the valve member is adapted to have the hydrogen leakage function. In this case, the valve member is preferably made of a hydrogen permeable material (e.g. hydrogen permeable rubber) to allow hydrogen gas to permeate through the valve member to the outside. Since the nickel-metal hydride storage battery uses the alkaline electrolyte, in particular, a hydrogen permeable resin (rubber) (e.g. EPDM) having a high resistance to alkali is preferably adopted. As an alternative structure, the valve member may be constituted of a plurality of components (for example a valve member constituted of a metal component and a rubber component integrally made by insert molding) so that hydrogen can leak out through between the constituent parts (e.g. the metal component and the rubber component).

EXPLANATION OF REFERENCE CODES

| | |
|---|---|
| 100, 200, 300, 400, 500, 600, 700, | Nickel-metal hydride storage battery |
| 101, 201, 301, 401, 501, 601 | Safety valve device |
| 102, 502, 602 | Case |
| 120, 520, 620 | Sealing cover |
| 130 | Battery casing |
| 150 | Battery main part |
| 503 | Hydrogen leakage device |

BEST MODE FOR CARRYING OUT THE INVENTION

The following descriptions will be made on preferred embodiments (Embodiments 1 to 4) of the present invention, referring to accompanying drawings.

Embodiment 1

Figure 1:
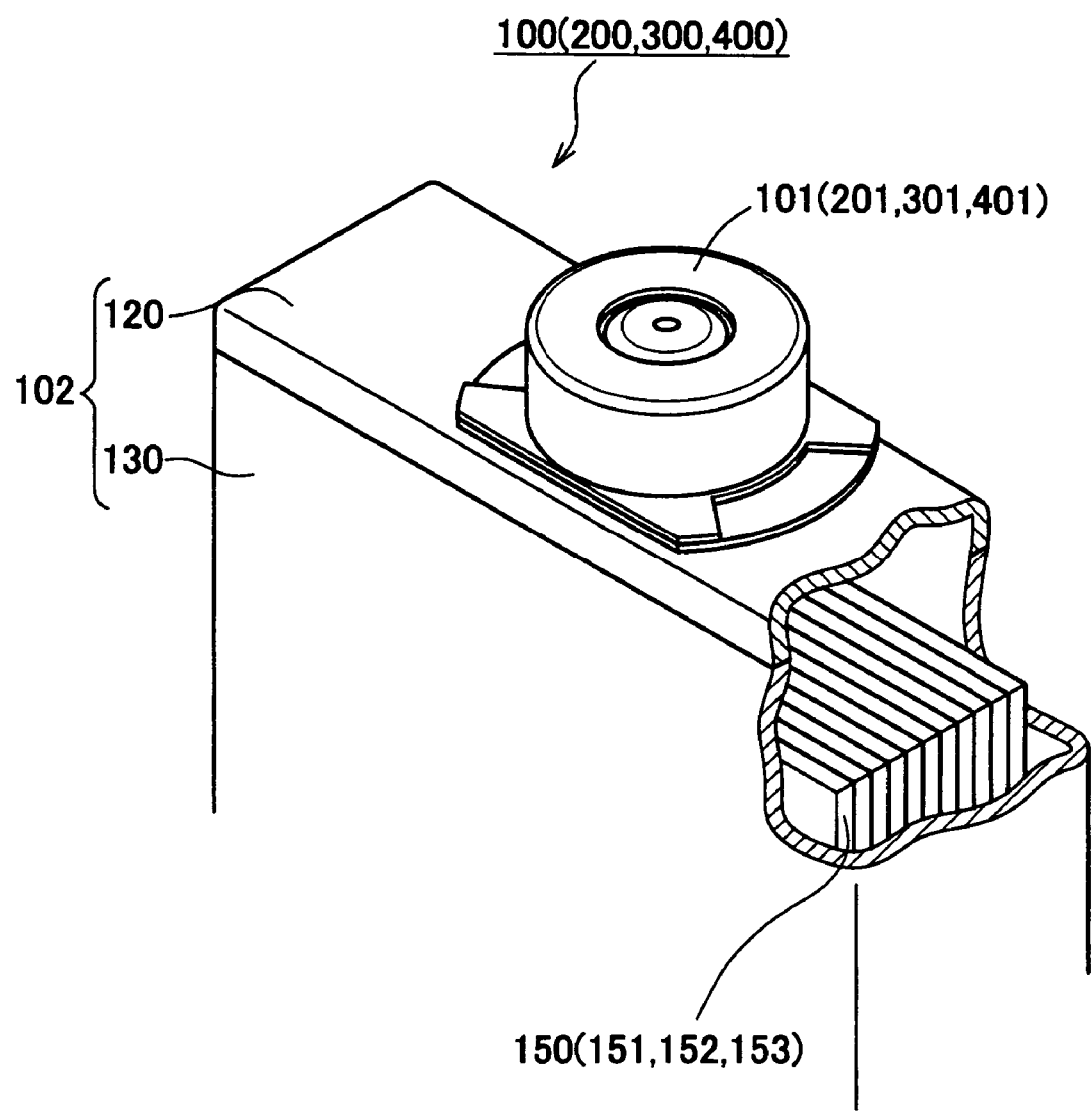
FIG. 1 is a partially cutaway perspective view of a nickel-metal hydride storage battery 100 to 400 in Embodiments 1 to 4.

A nickel-metal hydride storage battery 100 in Embodiment 1 is, as shown in FIG. 1, a rectangular sealed nickel-metal hydride storage battery including a case 102 provided with a sealing cover 120 and a battery casing 130, a safety valve device 101, and an electrode plate group 150 and an electrolyte (not shown) housed in the case 102 (the battery casing 130).

The electrode plate group 150 includes positive electrodes 151, negative electrodes 152, and bag-shaped separators 153. The positive electrodes 151 are inserted one in each bag-shaped separator 153. The positive electrodes 151 inserted in the separators 153 and the negative electrodes 152 are alternately arranged. Those positive electrodes 151 and negative electrodes 152 are collected to be connected to a positive terminal and a negative terminal, not shown in the figure, respectively.

Each of the nickel-metal hydride storage batteries in the embodiments (Embodiments 1 to 4) of the present invention is designed to have a positive electrode capacity of 6.5 Ah and a negative electrode capacity of 11.0 Ah. Thus, each of the nickel-metal hydride storage batteries in the embodiments (Embodiments 1 to 4) of the present invention has a battery capacity of 6.5 Ah in a positive electrode regulation.

The positive electrode 151 may be formed of for example an electrode plate comprising an active material containing nickel hydroxide and an active material carrier such as foamed nickel. The negative electrode 152 may be formed of for example an electrode plate containing a hydride absorbing alloy as a negative electrode constituting material. The separator 153 may be formed of for example non-woven fabric made of synthetic fibers subjected to a hydrophilic treatment. The electrolyte may include for example an alkaline solution having a specific gravity of 1.2 to 1.4 and containing KOH.

Figure 2:
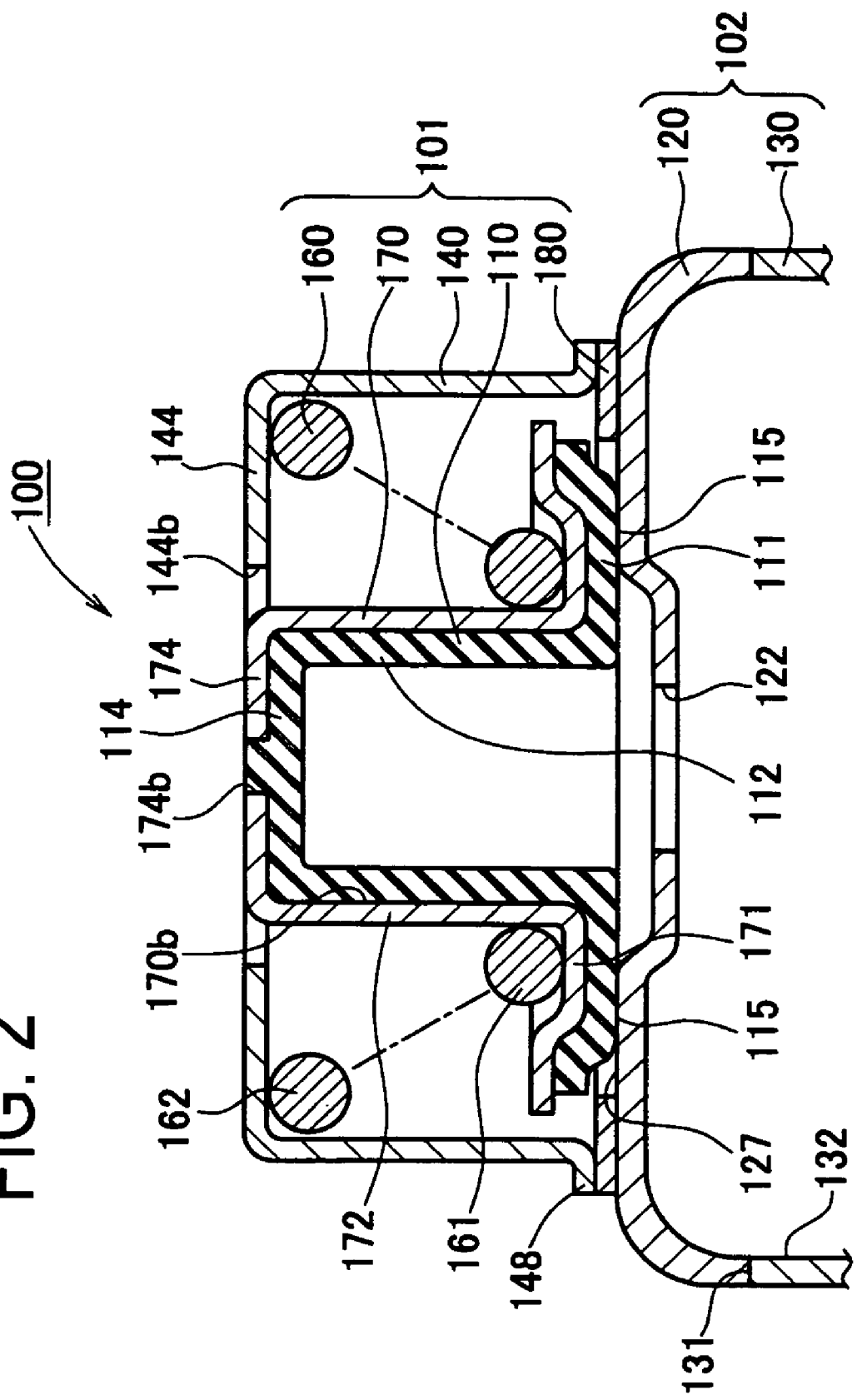
FIG. 2 is a longitudinal sectional view of the nickel-metal hydride storage battery 100 in Embodiment 1, showing a safety valve device 101 and its surroundings.

The battery casing 130 is made of metal (specifically, a nickel-plated steel plate) formed in a rectangular box shape. The sealing cover 120 is made of metal (specifically, a nickel-plated steel plate) formed in almost flat rectangular shape. The sealing cover 120 has a gas release hole 122 through which the inside of the case 102 is communicated with the outside thereof as shown in FIG. 2. This sealing cover 120 is placed on an open end 131 of the battery casing 130 and welded thereto over its entire circumference, closing an opening 132 of the battery casing 130. With this configuration, the sealing cover 120 and the battery casing 130 are integrally connected with no gap therebetween to form the case 102. In Embodiment 1, the case 102 is entirely made of metal (only a metal wall), the battery can have an excellent cooling property to prevent excessive increase in temperature of the battery. In each of the embodiments (Embodiments 1 to 4) of the present invention, the case is designed to have an inside dimension of 42 (mm)×15 (mm)×85 (mm), that is, an inner volume of 53.6 (cm$^3$).

The safety valve device 101 has a valve member 110, a valve cap 170, a coil spring 160, a base plate 180, and a safety valve case 140, as shown in FIG. 2. The base plate 180 is made of metal (specifically, a nickel-plated steel plate) formed in an annular flat shape, which is fixed on an outer surface 127 of the sealing cover 120. The valve cap 170 is made of metal (specifically, a nickel-plated steel plate) provided with a substantially circular flange 171, a cylindrical peripheral wall 172, and a disk-shaped top wall 174 formed with a through hole 174b.

The valve member 110 is made of rubber (specifically, EPDM) and includes a substantially circular flange 111, a cylindrical peripheral wall 112, and a disk-shaped top wall 114. The valve member 110 is of an outer shape matching an inner surface 170b of the valve cap 170. This valve member 110 fitted in the valve cap 170 is disposed on the outer surface 127 of the sealing cover 120 and inside the base plate 180. In Embodiment 1, the valve member 110 is formed with a wall thickness of 0.5 mm.

The safety valve case 140 is made of metal (specifically, a nickel-plated steel plate) formed in a closed-end, substantially cylindrical shape. A top wall 144 of this safety valve case 140 is formed with a through hole 144b having a larger diameter than the outer diameter of the peripheral wall 172 of the valve cap 170. This safety valve case 140 is fixed on the base plate 180. The coil spring 160 is of a spiral shape having a downwardly reduced diameter in FIG. 2. This coil spring 160 is placed in a compressed state in the safety valve case 140 in such a way that a small-diameter portion 161 is placed on the flange 171 of the valve cap 170 while a large-diameter portion 162 is pressed downwardly in FIG. 2 by the top wall 144 of the safety valve case 140. Accordingly, the flange 111 of the valve member 110 as well as the flange 171 of the sheathing member 170 is held down in FIG. 2 by the coil spring 160. A sealing surface 115 of the flange 111 of the valve cap 170 is thus held in close contact with the outer surface 127 of the sealing cover 120 with no gap therebetween.

The above safety valve device 101 is configured to release gas (hydrogen gas and the like) from the case 102 to the outside when the internal pressure in the case 102 exceeds a predetermined value, to prevent excessive rise in the internal pressure in the case 102. When the internal pressure in the case 102 exceeds the predetermined value, to be more precise, the gas in the case 102 presses up the valve cap 170 together with the valve member 110 in FIG. 2. This pressing force causes the coil spring 160 to be further compressed. Thus, the sealing surface 115 of the valve member 110 is separated from the outer surface 127 of the sealing cover 120, allowing the gas in the case 102 to be released to the outside of the valve member 110 and then to the outside of the battery through the through hole 144b of the top wall 144 of the safety valve case 140. As above, the excessive rise in the internal pressure in the case 102 can be prevented.

In the safety valve device 101 in Embodiment 1, the valve member 110 is formed of a thin wall made of rubber (EPDM) as shown in FIG. 2. Further, the valve member is formed in a closed-end, substantially cylindrical shape to provide a large contact area (a permeable area) with respect to hydrogen gas in the case 102. Such configuration allows the hydrogen in the case 102 to permeate through the wall of the valve member 110 and leak out of the battery through a slight gap between the valve member 110 and the valve cap 170 and then through the through hole 174b of the top wall 174 of the valve cap 170. Specifically, the safety valve device 101 has a hydrogen leakage function to allow the hydrogen gas in the case 102 to gradually leak out of the battery, in addition to an excessive-pressure preventing function to prevent excessive rise in the internal pressure in the case 102.

In the embodiments (Embodiments 1 to 4) of the present invention, each safety valve device has the hydrogen leakage function to allow the hydrogen gas in the case to permeate through the valve member to leak out of the battery as mentioned in Embodiment 1. Accordingly, the valve member may be designed variously to have different thickness, shapes, etc. to control the amount of the hydrogen gas in the case 102 to be allowed to permeate through the valve member per unit time (i.e., the hydrogen permeation rate of the valve member) as the details of Embodiments 2 to 4 will be mentioned later. In the embodiments (Embodiments 1 to 4) of the present invention, therefore, the safety valve device is arranged to regulate a hydrogen leak rate at which the hydrogen gas in the case 102 is allowed to leak out of the battery. Thus, the hydrogen leak rate of the entire battery can be controlled.

The nickel-metal hydride storage battery 100 in Embodiment 1 can be manufactured in the following manner.

Firstly, the positive electrodes 151 are put one in each of a plurality of bag-shaped separators 153. The plurality of separators 153 in each of which the positive electrode 151 is inserted and the plurality of negative electrodes 152 are alternately arranged to form the electrode plate group 150 (see FIG. 1). Subsequently, this electrode plate group 150 is disposed in the battery casing 130 and then the positive electrodes 151 are connected to the positive terminal not shown through lead wires and the negative electrodes 152 are connected to the negative terminal not shown through lead wires. The sealing cover 120 separately prepared is placed on the open end 131 of the battery casing 130 and welded thereto over the entire circumference, closing the opening 132 of the battery casing 130 (see FIG. 2). Accordingly, the sealing cover 120 and the battery casing 130 are assembled into the integral case 102 with no gap. Then, an alkaline aqueous solution having a specific gravity of about 1.3 is injected as an electrolyte into the case 102 through the release hole 122 of the sealing cover 120.

On the other hand, the valve element 110 is inserted in the valve cap 170. The coil spring 160 is put in the safety valve case 140 so that the large-diameter portion 162 of the coil spring 160 faces the top wall 144 of the safety valve case 140. Then, the valve cap 170 with the valve member 110 being fitted therein is incorporated into the safety valve case 140 so that the flange 171 of the sheathing member 170 is held in contact with the small-diameter portion 161 of the coil spring 160. The base plate 180 is then fixed to the flange 148 of the safety valve case 140 by laser welding. Thus, the safety valve device 101 is produced. This safety valve device 101 is placed on the outer surface 127 of the sealing cover 120 so that the safety valve device 101 is axially aligned with the release hole 122, and the safety valve device 101 is fixed to the sealing cover 120 (the case 102) by laser welding. As above, the nickel-metal hydride storage battery 100 in Embodiment 1 can be manufactured.

Embodiment 2

Figure 3:
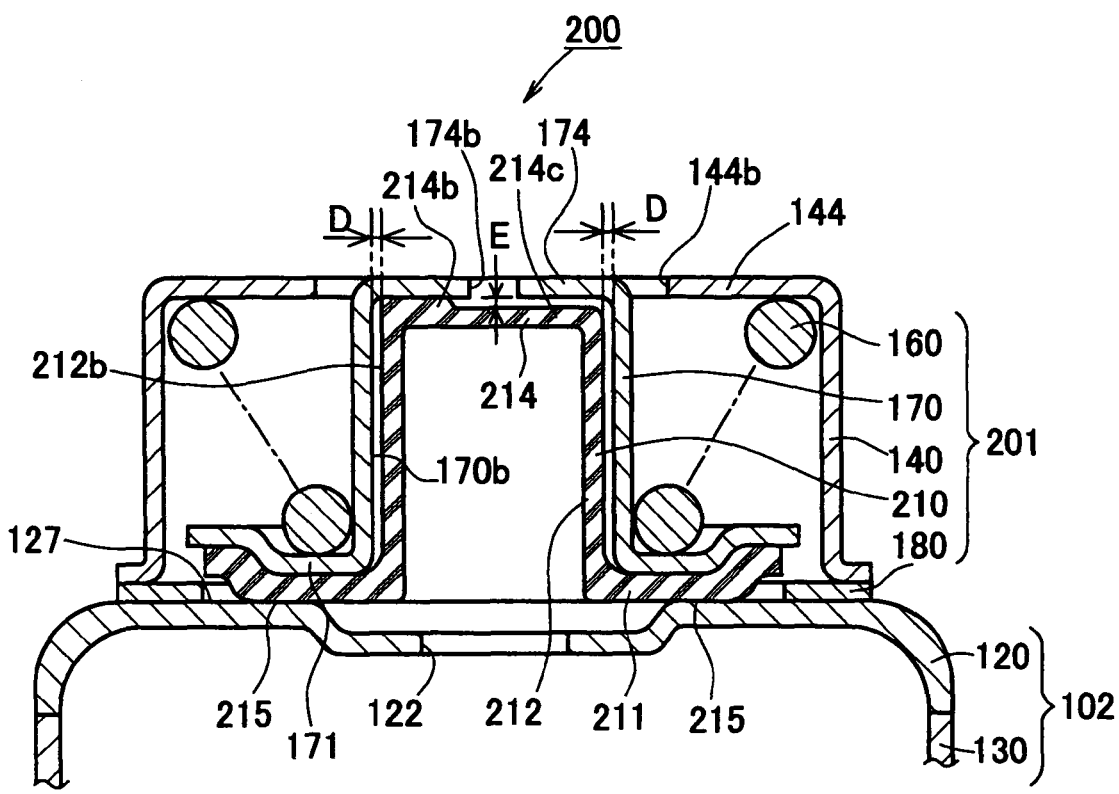
FIG. 3 is a longitudinal sectional view of the nickel-metal hydride storage battery 200 in Embodiment 2, showing a safety valve device 201 and its surroundings.

The following explanation will be made on a nickel-metal hydride storage battery 200 in Embodiment 2, referring to FIGS. 3 and 4. The nickel-metal hydride storage battery 200 in Embodiment 2 is different in the shape of a valve element from the nickel-metal hydride storage battery 100 in Embodiment 1 and similar thereto in other parts or components.

A valve member 210 in Embodiment 2 is different in the shapes of a side wall and a top wall (see FIGS. 3 and 4) from the valve member 110 in Embodiment 1 (see FIG. 2). To be more specific, although the peripheral wall 112 of the valve member 110 in Embodiment 1 is of an annular shape having a flat outer periphery, a peripheral wall 212 of the valve member 210 in Embodiment 2 has a corrugated outer periphery with a plurality of protruding portions 212b and recessed portions 212c which are alternately arranged in a circumferential direction as shown in FIG. 4.

Figure 4:
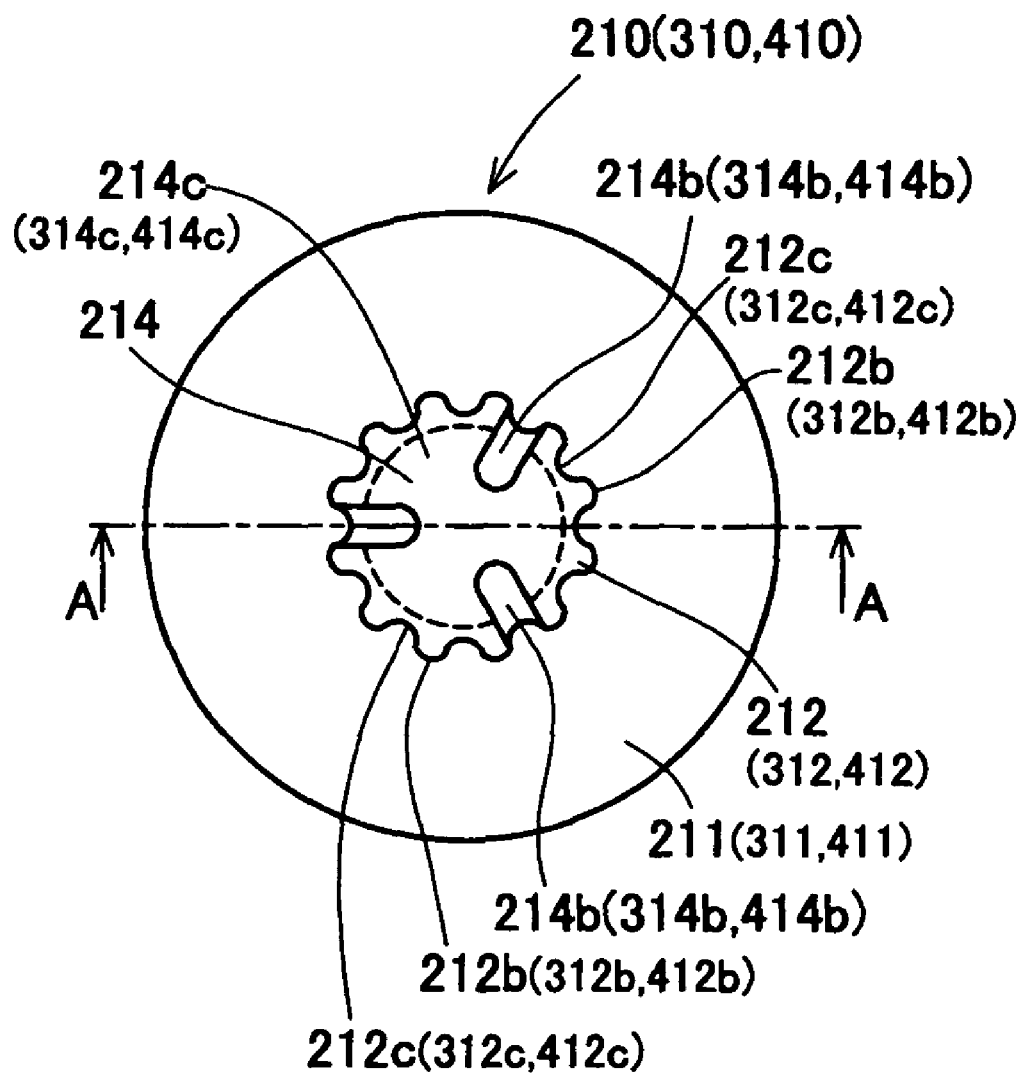
FIG. 4 is a top view of a valve member 210 in Embodiment 2.

On the top wall 214 of the valve member 210 in Embodiment 2, three raised portions 214b are provided, circumferentially spaced at regular intervals, as shown in FIG. 4. The part of the top wall 214 other than the raised portions 214b is referred to as a thin-walled portion 214c. In this valve member 210, the thickness of the recessed portion 212c of the peripheral wall 212 and the thickness of the thin-walled portion 214c of the top wall 214 are 0.3 mm respectively, thinner than the thickness (0.5 mm) of the valve member 110 in Embodiment 1. Accordingly, the valve member 210 in Embodiment 2 allows hydrogen gas to more easily permeate therethrough as compared with the valve member 110 in Embodiment 1.

The above valve member 210 is fitted in the valve cap 170 (see FIG. 3) as in Embodiment 1. In the meantime, the peripheral wall 212 of the valve member 210 is formed in the corrugated shape as mentioned above. The protruding portions 212b are therefore brought into contact with an inner surface 170b of the valve cap 170. Accordingly gaps D can be generated between the recessed portions 212c and the inner surface 170b of the valve cap 170. Further, since the top wall 214 of the valve member 210 has the raised portions 214b, gaps E can be generated between the thin-walled portion 214c of the top wall 214 and the inner surface 170b of the valve cap 170. This allows the hydrogen gas having permeated through the valve member 210 to pass through the gaps D and E to smoothly leak out of the battery through the through hole 174b of the top wall 174 of the valve cap 170.

Consequently, in the nickel-metal hydride storage battery 200 in Embodiment 2, the hydrogen gas in the case 102 can leak out of the battery more smoothly than in the nickel-metal hydride storage battery 100 in Embodiment 1. Thus, the nickel-metal hydride storage battery 200 in Embodiment 2 can provide a higher leak rate of hydrogen gas in the case 102 to be allowed to leak out of the battery than in the nickel-metal hydride storage battery 100 in Embodiment 1.

Embodiment 3

The following explanation will be made on a nickel-metal hydride storage battery 300 in Embodiment 3, referring to FIG. 5. This nickel-metal hydride storage battery 300 in Embodiment 3 is different in the shape of a valve member (specifically, the thickness) from the nickel-metal hydride storage battery 200 in Embodiment 2 and similar thereto in other parts or components.

A valve member 310 in Embodiment 3 includes, as in Embodiment 2, a peripheral wall 312 having a corrugated outer periphery with a plurality of protruding portions 312b and recessed portions 312c (see FIG. 4). Further, as in Embodiment 2, a top wall 314 of the valve member 310 is provided with three raised portions 314b. The part of the top wall 314 other than the raised portions 314b is referred to as a thin-walled portion 314c. In this valve member 310, the thickness of the recessed portion 312c of the peripheral wall 312 and the thickness of the thin-walled portion 314c of the top wall 314 are 0.2 mm respectively, thinner than the thickness (0.3 mm) of the valve member 210 in Embodiment 2. Accordingly, the valve member 310 in Embodiment 3 allows hydrogen gas to more easily permeate therethrough as compared with the valve member 210 in Embodiment 2.

Figure 5:
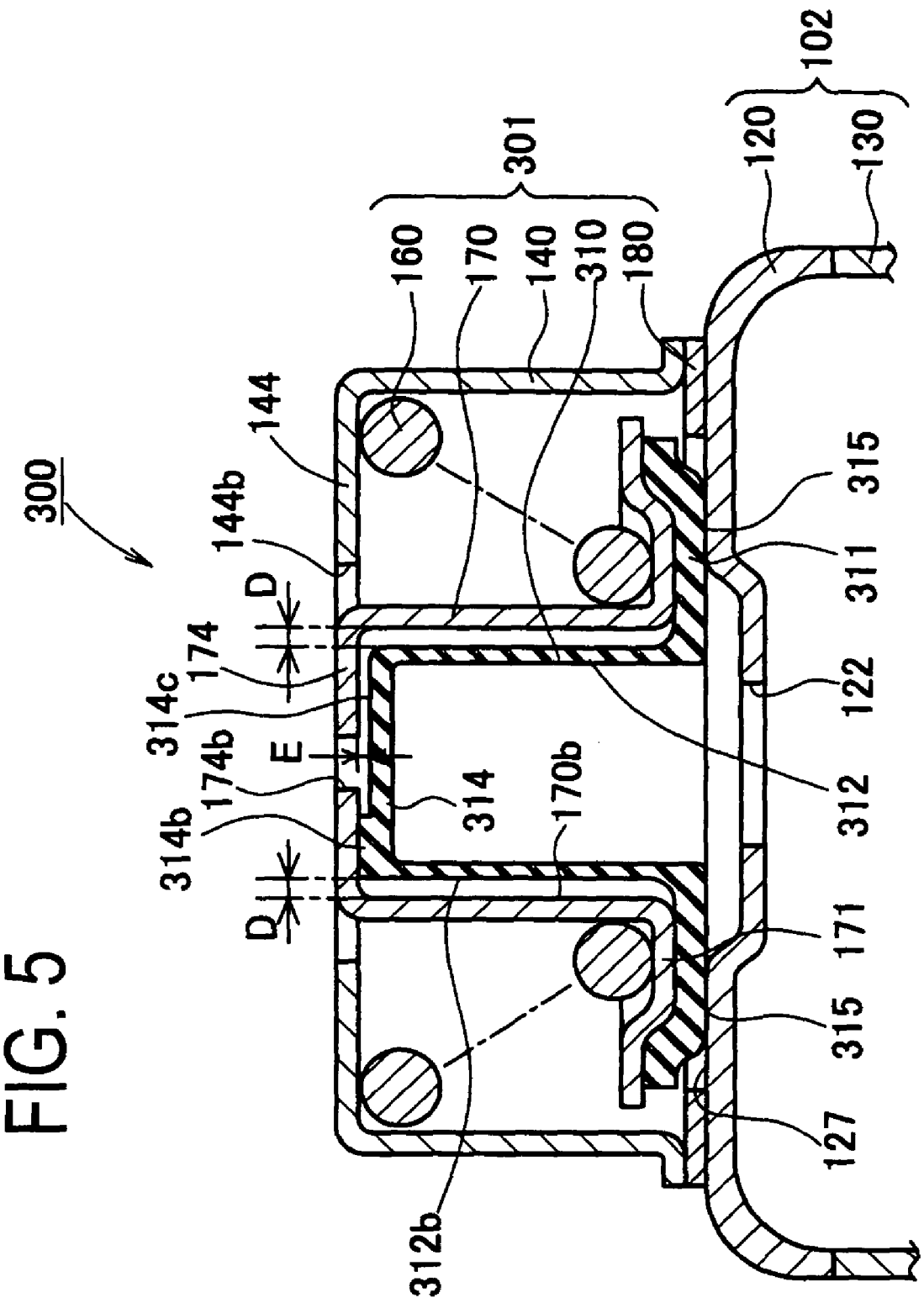
FIG. 5 is a longitudinal sectional view of the nickel-metal hydride storage battery 300 in Embodiment 3, showing a safety valve device 301 and its surroundings.

The above valve member 310 is fitted in the valve cap 170 in the same manner as in Embodiment 2, generating gaps D between the recessed portions 212c of the peripheral wall 312 and the inner surface 170b of the valve cap 170 and gaps E between the thin-walled portion 314c of the top wall 314 and the inner surface 170b of the valve cap 170 (see FIG. 5). As mentioned above, the valve member 310 in Embodiment 3 is thinner than the valve member 210 in Embodiment 2, thus providing larger gaps D and E than those in Embodiment 2. This allows the hydrogen gas having permeated through the valve member 310 to pass through the gaps D and E to more smoothly leak out of the battery through the through hole 174b of the top wall 174 of the valve cap 170.

Consequently, in the nickel-metal hydride storage battery 300 in Embodiment 3, the hydrogen gas in the case 102 can leak out of the battery more smoothly than in the nickel-metal hydride storage battery 200 in Embodiment 2. Thus, the nickel-metal hydride storage battery 300 in Embodiment 3 can provide a higher leak rate of hydrogen gas in the case 102 to be allowed to leak out of the battery than in the nickel-metal hydride storage battery 200 in Embodiment 2.

Embodiment 4

The following explanation will be made on a nickel-metal hydride storage battery 400 in Embodiment 4, referring to FIG. 6. This nickel-metal hydride storage battery 400 in Embodiment 4 is different in the shape of a safety valve device (specifically, the diameters of the valve member, the valve cap, and others are larger) from the nickel-metal hydride storage battery 300 in Embodiment 3 and similar thereto in other parts or components.

Figure 6:
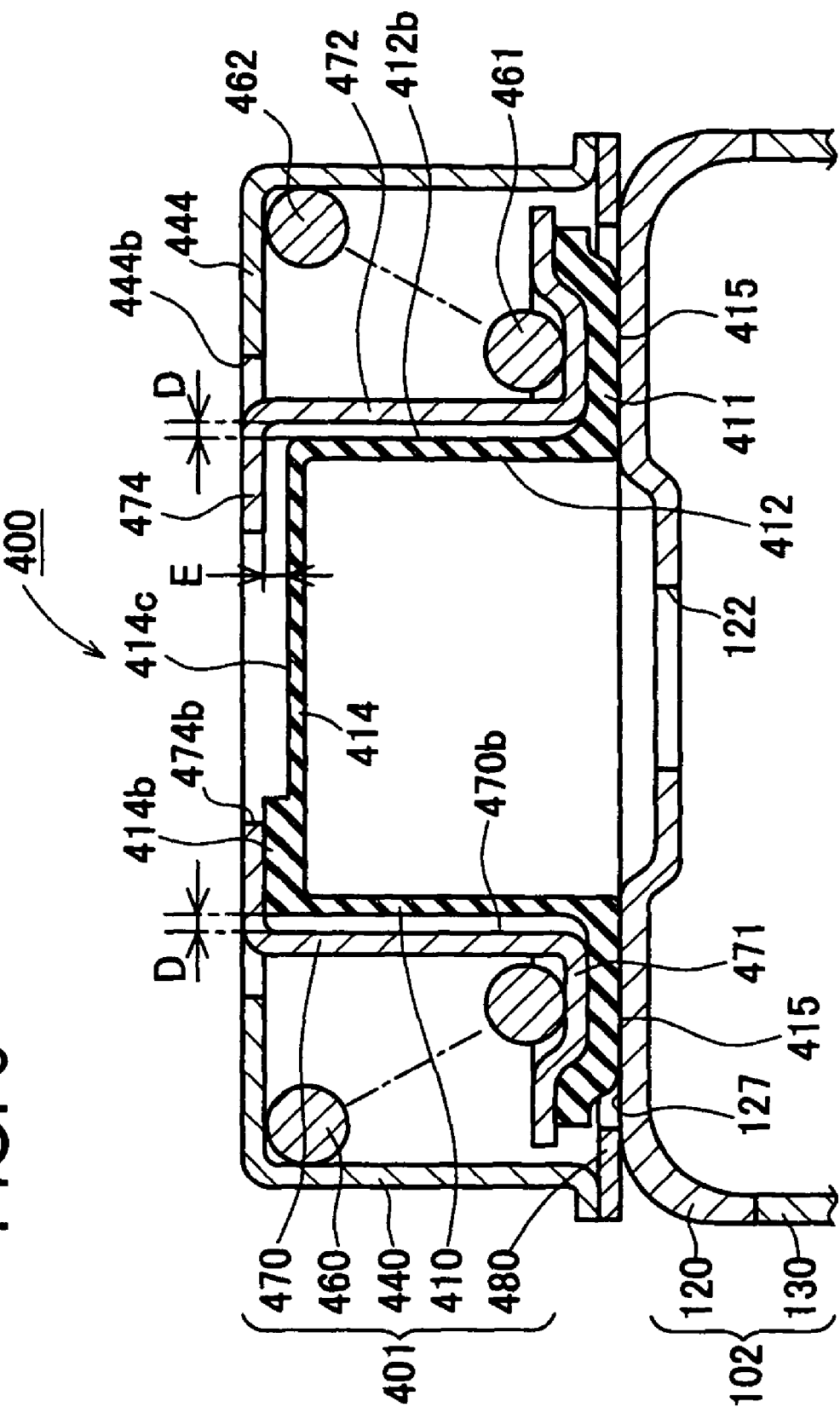
FIG. 6 is a longitudinal sectional view of the nickel-metal hydride storage battery 400 in Embodiment 4, showing a safety valve device 401 and its surroundings.

A valve member 410 in Embodiment 4 includes, as in Embodiment 3, a peripheral wall 412 having a corrugated outer periphery with a plurality of protruding portions 412b and recessed portions 412c (see FIG. 6). Further, as in Embodiment 3, a top wall 414 of the valve member 410 is provided with three raised portions 414b. The part of the top wall 414 other than the raised portions 414b is referred to as a thin-walled portion 414c. In this valve member 410, the thickness of the recessed portion 412c of the peripheral wall 412 and the thickness of the thin-walled portion 414c of the top wall 414 are 0.2 mm respectively, equal to the thickness of those of the valve member 310 in Embodiment 3. In addition, as will be apparent from comparison between FIGS. 5 and 6, the valve member 410 in Embodiment 4 has a larger diameter than the valve member 310 in Embodiment 3 to provide a larger contact area (a permeable area) with respect to hydrogen gas. Such valve member 410 in Embodiment 4 allows the hydrogen gas to permeate therethrough more smoothly than the valve member 310 in Embodiment 3.

The above valve member 410 is fitted in a valve cap 470 as in Embodiment 3, generating gaps D between the recessed portions 412c of the peripheral wall 412 and an inner surface 470b of the valve cap 470 and gaps E between the thin-walled portion 414c of the top wall 414 and the inner surface 470b of the valve cap 470 (see FIG. 6). This allows the hydrogen gas having permeated through the valve member 310 to pass through the gaps D and E to smoothly leak out of the battery through a through hole 474b of the top wall 474 of the valve cap 470 in the same manner as in Embodiment 3.

Consequently, in the nickel-metal hydride storage battery 400 in Embodiment 4, the valve member 410 is lager in diameter than the valve member 310 in Embodiment 3, providing a larger contact area (a permeable area). Accordingly, the hydrogen gas in the case 102 can leak out of the battery more smoothly than in the nickel-metal hydride storage battery 300 in Embodiment 3. Thus, the nickel-metal hydride storage battery 400 in Embodiment 4 can provide a higher leak rate of hydrogen gas in the case to be allowed to leak out of the battery than in the nickel-metal hydride storage battery 300 in Embodiment 3.

As described above, in each of the embodiments (Embodiments 1 to 4) of the present invention, each safety valve device 100 to 400 has the hydrogen leakage function to allow the hydrogen gas in the case 102 to permeate through each valve member 110 to 410 to leak out of the battery. When the valve members are designed variously to have different thickness, shape, etc. as in Embodiments 1 to 4, the safety valve devices can provide different hydrogen leak rates. Consequently, in the nickel-metal hydride storage battery of the present invention, therefore, the safety valve device is arranged to regulate the leak rate of hydrogen gas in the case 102 to be allowed to leak out of the battery. Thus, the hydrogen leak rate of the entire battery can be controlled.

Comparative Embodiment 1

The following explanation will be made on a nickel-metal hydride storage battery 700 in Comparative Embodiment 1, referring to FIG. 15. This nickel-metal hydride storage battery 700 is different in only a safety valve device from the nickel-metal hydride storage battery 100 in Embodiment 1 and similar thereto in other parts or components.

Figure 15:
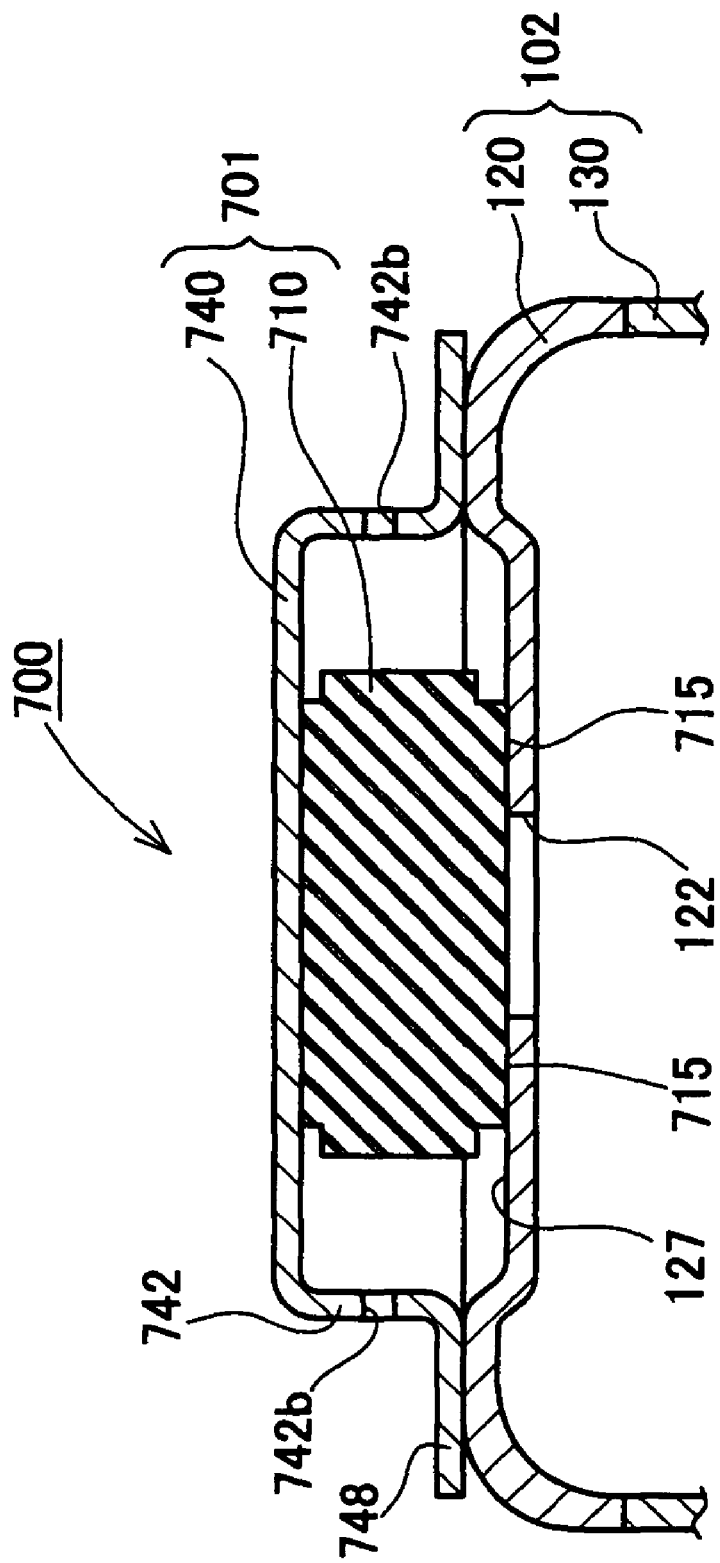
FIG. 15 is a longitudinal sectional view of a nickel-metal hydride storage battery 700 in a first comparative example, showing a safety valve device 701 and its surroundings.

A safety valve device 701 in this Comparative Embodiment 1 is a conventional safety valve device, which includes a valve member 710 and a safety valve case 740 as shown in FIG. 15. The valve member 710 is made of rubber (specifically, EPDM) and has a substantially cylindrical shape. This valve member 710 is disposed on an outer surface 127 of a sealing cover 120, closing a gas release hole 122 formed in the sealing cover 120.

The safety valve case 740 is made of metal (specifically, a nickel-plated steel plate) formed in a closed-end, substantially cylindrical shape including a flange 748. This safety valve case 740 has a plurality of rectangular through holes 742b formed in a peripheral wall 742. The flange 748 of the safety valve case 740 is fixed to the sealing case 120 by laser welding while the valve member 710 is held down in FIG. 15. Thus, a sealing surface 715 of the valve member 710 is held in close contact with the outer surface 127 of the sealing cover 120 with no gap therebetween, closing the gas release hole 122.

Comparative Embodiment 2

The following explanation will be made on a nickel-metal hydride storage battery 800 in Comparative Embodiment 2, referring to FIG. 16. This nickel-metal hydride storage battery 800 is different in the material of a case and a safety valve device from the nickel-metal hydride storage battery 100 in Embodiment 1 and similar thereto in other parts or components.

A case 802 in Comparative Embodiment 2 is made of resin (e.g. a polymer alloy of PP and PPE). In this Comparative Embodiment 2, similar to Embodiments 1 to 4, the case is of an inside dimension of 42 (mm)×15 (mm)×85 (mm), that is, an inner volume of 53.6 (cm$^3$).

Figure 16:
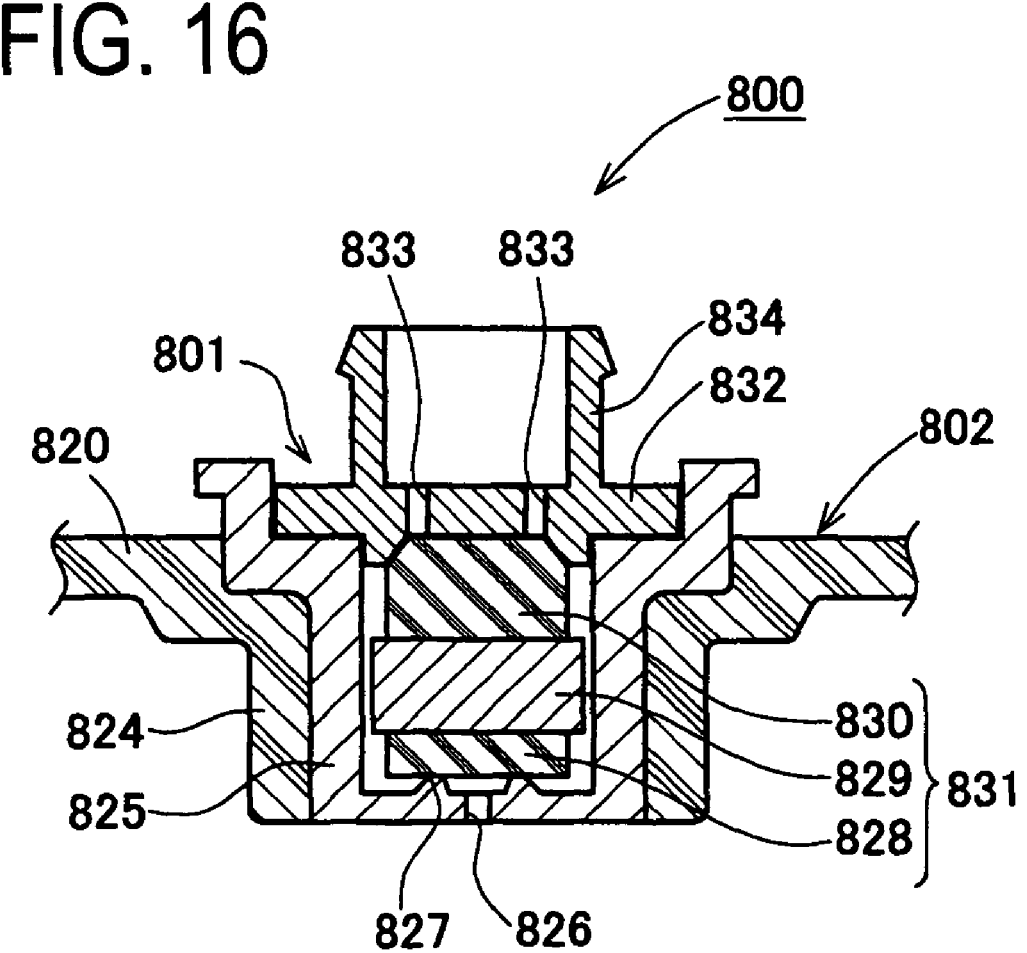
FIG. 16 is a longitudinal sectional view of a nickel-metal hydride storage battery 800 in a second comparative example, showing a safety valve device 801 and its surroundings.

As shown in FIG. 16, a safety valve device 801 in Comparative Embodiment 2 is a similar product to a safety valve device of a nickel-metal hydride storage battery disclosed in Jpn. unexamined patent publication 2001-110388. Specifically, this safety valve device 801 has a valve case 825, a valve element 831, and a valve lid 832. The valve case 825 is of a closed-end, substantially cylindrical shape, formed with a gas release hole 826 in the center of the bottom and a circumferential projection 827 around this gas release hole 826. This valve case 825 is fitted and welded in a stepped cylindrical recess 824 formed in the upper wall of a cover 820 of the case 802.

The valve element 831 includes a sealing part 828, an elastic part 830, and a rigid part 829 supporting both parts. This valve element 831 is inserted in the valve case 825 so that the sealing part 828 is held in contact with the projection 827. The valve lid 832 has release ports 833 through which gas will be released and a joint 834 to be connected with a discharge tube. This valve lid 832 is fitted on an upper open end of the valve case 825 by welding. This elastically presses the elastic part 830 of the valve element 831 downwardly in FIG. 16 to bring the sealing part 828 into pressure-contact with the projection 827 of the valve case 825, thus closing the gas release hole 826.

(Measurement of Hydrogen Leakage Amount)

The hydrogen leakage amount was measured on six samples S; the nickel-metal hydride batteries 100 to 400 in Embodiments 1 to 4 and the nickel-metal hydride batteries 700 and 800 in Comparative Embodiments 1 and 2. Those six samples S has been activated in advance by charging and discharging and charged to 60% SOC (State of Charge). The measurement of hydrogen leakage amount of the six samples S was performed using a measurement system disclosed in Jpn. unexamined patent publication 2001-236986. Each of the samples S has a capacity of 6.5 Ah at 100% SOC.

Figure 14:
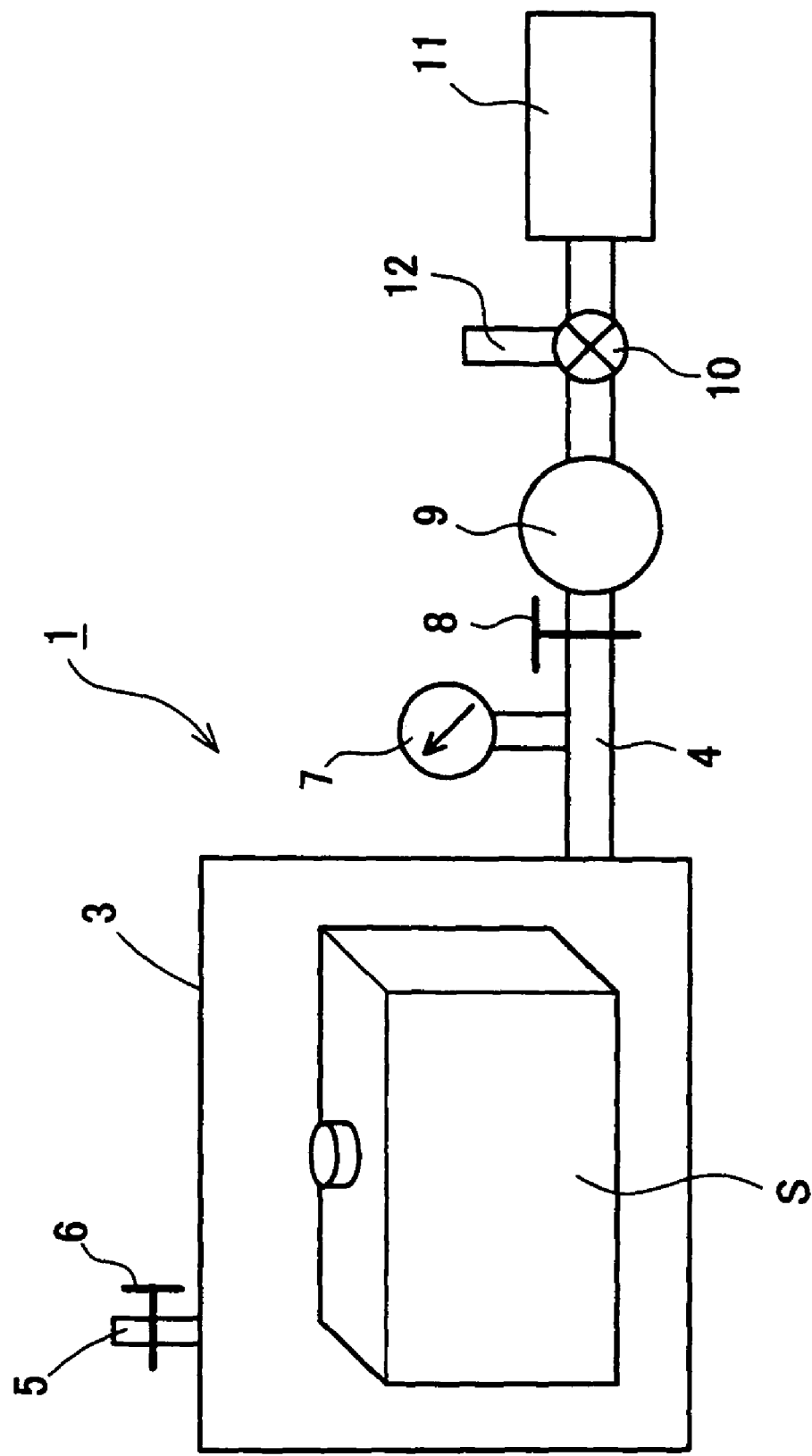
FIG. 14 is a schematic configuration view of a measuring system for measuring a hydrogen leakage amount of the nickel-metal hydride storage battery.

The measurement system 1 includes a sealed container 3, a vacuum discharge pipe 4 connected to this container 3, and an air release port 5 provided with an opening/closing valve 6, as shown in FIG. 14. In the vacuum discharge pipe 4, a barometer 7, an opening/closing valve 8, a vacuum pump 9, a changeover valve 10, and a hydrogen concentration sensor 11 are arranged in this order from the sealed container 3 side. The changeover valve 10 is configured to be switchable among a position for connecting an outlet of the vacuum pump 9 to the air release port 12, a position for connecting the outlet of the vacuum pump 9 to the hydrogen concentration sensor 11, and a position for connecting the air release port 12 to the hydrogen concentration sensor 11. In the sealed container 3, an infrared heater not shown is disposed to heat a sample S placed in the sealed container 3 to increase the temperature thereof.

A method of measuring the hydrogen leakage amount using the above measurement system 1 will be described in detail below.

Firstly, the changeover valve 10 of the measurement system 1 is switched to the position for bringing the air release port 12 into communication with the hydrogen concentration sensor 11. The concentration of hydrogen in the air is measured and its measured value is regarded as an atmospheric hydrogen concentration b. Secondly, a sample S (e.g. the nickel-metal hydride storage battery 100) having been subjected to charging and discharging is put in the sealed container 3 and the opening/closing valve 6 of the air release port 5 is closed. Then, using the infrared heater not shown, the sample S placed in the sealed container 3 is heated to a temperature of 45° C. The opening/closing 8 of the vacuum discharge pipe 4 is then opened. The changeover valve 10 is switched to the position for bringing the outlet of the vacuum pump 9 into communication with the air release port 12 and then the vacuum pump 9 is actuated to reduce the pressure in the sealed container 3 to 10 kPa.

The sealed container 3 is kept at 10 kPa for 15 min. Then, the changeover valve 10 is switched to the position for bringing the outlet of the vacuum pump 9 into communication with the hydrogen concentration sensor 11. This allows the gas in the sealed container 3 to flow in the hydrogen concentration sensor 11 to measure the hydrogen concentration in the sealed container 3. This measured value is regarded as an in-container hydrogen concentration c. Subsequently, a hydrogen leakage amount M (µl) of the sample S is calculated based on a difference between the atmospheric hydrogen concentration b and the in-container hydrogen concentration c. Thus, a hydrogen leak rate V1 (µl/h/Ah) and a hydrogen leak rate V2 (µl/h/cm$^3$) of each of the six samples S were calculated based on the hydrogen leakage amount M (µl) calculated as above.

To be concrete, the hydrogen leak rate V1 (µl/h/Ah) is a value obtained by calculating the hydrogen leakage amount per one hour based on the hydrogen leakage amount M (µl) and dividing the calculated value by a battery capacity of 6.5 Ah. Further, the hydrogen leak rate V2 (µl/h/cm$^3$) is a value obtained by calculating the hydrogen leakage amount per one hour based on the hydrogen leakage amount M (µl) and dividing the calculated value by an inner volume of the case (a concrete example is 53.6 cm$^3$). This result is shown in Table 1.

TABLE 1

| | Hydrogen permeation rate (45° C., 60% SOC) | |
|---|---|---|
| | V1 (µl/h/Ah) | V2 (µl/h/cm$^3$) |
| Embodiment 1 | 2.00 | 0.24 |
| Embodiment 2 | 3.66 | 0.44 |
| Embodiment 3 | 9.15 | 1.1 |
| Embodiment 4 | 13.7 | 1.7 |
| Comparative Embodiment 1 | 0.97 | 0.12 |
| Comparative Embodiment 2 | 18.3 | 2.2 |

As shown in Table 1, the hydrogen leak rates of the nickel-metal hydride storage battery 700 in Comparative Embodiment 1 were V1 (µl/h/Ah)=0.97 and V2 (µl/h/cm$^3$)=0.12, which were the minimum values among the results of the six samples. This conceivable reason is that the valve member 710 is placed on the outer surface 127 of the sealing cover 120 to close the gas release hole 122 (see FIG. 15). In other words, the valve member 710 only has the contact area (the permeable area) with respect to the hydrogen gas in the case 102, as small as the open area of the gas release hole 122, and the hydrogen gas in the case 102 could not sufficiently permeate through the valve member 710.

In the nickel-metal hydride batteries 100 to 400 in Embodiments 1 to 4, on the other hand, the hydrogen leak rates V1 (µl/h/Ah) were 2.00, 3.66, 9.15, and 13.7 respectively and the hydrogen leak rates V2 (µl/h/cm$^3$) were 0.24, 0.44, 1.1, and 1.7 respectively, which were larger values than those of the nickel-metal hydride storage battery 700 in Comparative Embodiment 1. The reason for this is thought to be that, in Embodiments 1 to 4, each of the valve members 110 to 410 is formed in a closed-end, substantially cylindrical shape providing the large contact area (the permeable area) with respect to the gas in the case 102 (see FIGS. 2 to 6).

Further, in the nickel-metal hydride batteries 100 to 400 in Embodiments 1 to 4, the hydrogen leak rates V1 and V2 are larger in this order. This is conceivably because, in the order of Embodiments 1 to 4, the hydrogen gas in the case 102 is allowed to more easily leak out of the battery for the following reason.

Firstly, the nickel-metal hydride storage battery 100 in Embodiment 1 and the nickel-metal hydride storage battery 200 in Embodiment 2 are compared. In Embodiment 1, the valve member 110 is arranged in close contact with the valve cap 170 (see FIG. 2). In Embodiment 2, on the other hand, the valve member 210 includes the peripheral wall 212 having a corrugated outer surface, providing the gaps D between the peripheral wall 212 and the inner surface 170b of the valve cap 170 (see FIG. 3). Further, the valve member 210 includes the top wall 214 having the raised portions 214b, providing the gap E between the top wall 214 and the inner surface 170b of the valve cap 170. Accordingly, the hydrogen gas having permeated through the valve member 210 is allowed to pass through the gaps D and E and thus smoothly leak out of the battery through the through hole 174b of the top wall 174 of the valve cap 170. Consequently, the nickel-metal hydride storage battery 200 in Embodiment 2 allows easier leakage of the hydrogen gas from the case 102 to the outside of the battery than the nickel-metal hydride storage battery 100 in Embodiment 1.

Secondly, the nickel-metal hydride storage battery 200 in Embodiment 2 and the nickel-metal hydride storage battery 300 in Embodiment 3 are compared. In Embodiment 3, the valve member 310 is designed to be smaller in thickness than the valve member 210 in Embodiment 2, thus providing larger gaps D and E than those in Embodiment 2. This makes it possible to increase the permeation rate of hydrogen gas to be allowed to permeate through the valve member in Embodiment 3 than in Embodiment 2 and allow the hydrogen gas having permeated through the valve member 310 to pass through the gaps D and E to more smoothly leak out of the battery through the through hole 174b of the top wall 174 of the valve cap 170 than in Embodiment 2. As above, the nickel-metal hydride storage battery 300 in Embodiment 3 allows the hydrogen gas in the case 102 to more easily leak out of the battery than the nickel-metal hydride storage battery 200 in Embodiment 2.

Thirdly, the nickel-metal hydride storage battery 300 in Embodiment 3 and the nickel-metal hydride storage battery 400 in Embodiment 4 are compared. Those batteries are identical in the thickness of the valve members and the dimension of the gaps D and E. In Embodiment 4, however, the valve member 410 is designed to be larger in diameter than the valve member 310 in Embodiment 3, providing a larger contact area (a permeable area) with respect to hydrogen gas. Accordingly, the nickel-metal hydride storage battery 400 in Embodiment 4 allows easier leakage of hydrogen gas from the case 102 to the outside of the battery than the nickel-metal hydride storage battery 300 in Embodiment 3.

Further, as shown in Table 1, the hydrogen leak rates of the nickel-metal hydride storage battery 800 in Comparative Embodiment 2 were V1 (µl/h/Ah)=18.3 and V2 (µl/h/cm$^3$)=2.2, which were the maximum values among the results of the six samples. This conceivable reason is that, in the nickel-metal hydride storage battery 800 in Comparative Embodiment 2, differently from other samples S, the case 802 is made of resin (e.g. a polymer alloy of PP and PPE). It is specifically conceivable that, since the resin such as the polymer alloy of PP and PPE has higher hydrogen permeability than metal, the hydrogen gas in the case 802 was made to directly permeate through the case 802 to the outside.

(Measurement of Discharge Reserve Capacity)

The discharge reserve capacity remaining after a storage test was measured on six samples S; the nickel-metal hydride batteries 100 to 400 in Embodiments 1 to 4 and the nickel-metal hydride batteries 700 and 800 in Comparative Embodiments 1 and 2. To be more concrete, the six samples S were prepared, two for each sample, providing two pairs of the six samples S. Each sample S was charged to 80% SOC. The first pair of six samples S was allowed to stand in a temperature-controlled chamber at 65° C. for three months and the second pair of six samples S was allowed to stand therein for six months. The reason why the temperature of the temperature-controlled chamber was set at a relatively high is to quickly cause the corrosion of the hydrogen absorbing alloy of the negative electrode and also increase the hydrogen leakage amount. In this storage test, to prevent the depth of discharge of each battery (to prevent a battery voltage from decreasing to less than 1V, leading to deterioration), each battery was fully discharged (0% SOC) and then charged again to 80% SOC every one month.

The samples S allowed to stand in the temperature-controlled chamber at 65° C. for three or six months were successively discharged until respective battery voltages were reduced to 1V. Then, in each sample S, a hole was made in the top of the battery and an electrolyte was refilled through this hole until the electrolyte became overfilled. In the electrolyte in each case, an Hg/HgO reference electrode not shown was immersed. Each battery was then overdischarged and its discharge capacity was measured. Here, the discharge reserve capacity was calculated by the following expression:

(Discharge reserve capacity)=(Capacity discharged by the time the electric potential of the negative electrode 152 become −0.7V than the electric potential of the reference electrode)−(Capacity discharged by the time the electric potential of the positive electrode 151 become −0.5V than the electric potential of the reference electrode).

The discharge reserve capacity of each sample S determined before the storage test was 2.5 Ah. These results are shown in Table 2.

TABLE 2

| | Discharge reserve capacity (Ah) | | |
|---|---|---|---|
| | Before storage test | After three months | After six months |
| Embodiment 1 | 2.5 | 3.9 | 4.1 |
| Embodiment 2 | 2.5 | 3.7 | 3.9 |
| Embodiment 3 | 2.5 | 2.9 | 3.0 |
| Embodiment 4 | 2.5 | 2.1 | 1.5 |
| Comparative Embodiment 1 | 2.5 | 4.3 | 5.6 |
| Comparative Embodiment 2 | 2.5 | 1.3 | −0.5 |

As will be apparent from Table 2, in the nickel-metal hydride storage battery 700 in Comparative Embodiment 1, the discharge reserve capacity increased with time and, after six months, it increased to 5.6 Ah. In other words, the charge reserve capacity ran short (the charge reserve capacity was −1.1 Ah), which may cause the safety valve to open if the battery is fully charged. The conceivable reason is that, the hydrogen leak rates of the nickel-metal hydride storage battery 700 in Comparative Embodiment 1 were V1 (μl/h/Ah)=0.97 and V2 (μl/h/cm$^3$)=0.12, resulting in that the increasing amount of hydrogen in the battery caused by corrosion of the hydrogen absorbing alloy of the negative electrode largely exceeded the decreasing amount of hydrogen resulting leakage of hydrogen gas to the outside of the battery. As evidenced by this result, when the hydrogen leak rates are V1 (μl/h/Ah)=0.97 and V2 (μl/h/cm$^3$)=0.12, the leak rate of hydrogen gas is too small and hence it is difficult to suppress the lowering of battery characteristics for a long term.

It is to be noted that the charge reserve capacity can be calculated based on the following expression:

(Charge reserve capacity)=(Negative electrode capacity)−(Positive electrode capacity)−(Discharge reserve capacity).

Accordingly, the charge reserve capacity after six months in Comparative Embodiment 1 can be calculated as "11−6.5−5.6=−1.1 (Ah)".

In the nickel-metal hydride storage battery 800 in Comparative Embodiment 2, to the contrary, the discharge reserve capacity decreased with time and, after six months, the discharge reserve capacity ran short and further decreased to −0.5 Ah. In other words, the nickel-metal hydride storage battery was placed in a negative electrode regulation with reduced discharge capacity. The conceivable reason is that in the nickel-metal hydride storage battery 800 in Comparative Embodiment 2 the hydrogen leak rates were V1 (μl/h/Ah)=18.3 and V2 (μl/h/cm$^3$)=2.2, resulting in that the decreasing amount of hydrogen caused by leakage of hydrogen gas to the outside of the battery largely exceeded the increasing amount of hydrogen in the battery caused by corrosion of the hydrogen absorbing alloy of the negative electrode. As evidenced by this result, when the hydrogen leak rates are V1 (μl/h/Ah)=18.3 and V2 (μl/h/cm$^3$)=2.2, the leak rate of hydrogen gas is too large and hence it is difficult to suppress the lowering of battery characteristics for a long term.

On the other hand, in the nickel-metal hydride storage battery 100 in Embodiment 1, the discharge reserve capacity increased with time but remained at 4.1 Ah after six months. In other words, the charge reserve capacity decreased but a charge reserve capacity of 0.4 Ah remained. As for the charge reserve capacity after six months in Embodiment 1, it was calculated as "11−6.5−4.1=0.4 (Ah)".

Further, in the nickel-metal hydride storage battery 200 in Embodiment 2, the discharge reserve capacity also increased with time but remained at 3.9 Ah after six months. In other words, the charge reserve capacity decreased but a charge reserve capacity of 0.6 Ah remained. As for the charge reserve capacity after six months in Embodiment 2, it was calculated as "11−6.5−3.9=0.6 (Ah)".

In the nickel-metal hydride storage battery 300 in Embodiment 3, similarly, the discharge reserve capacity increased with time but this increasing amount was slight and the discharge reserve capacity was 3.0 Ah after six months. In other words, the charge reserve capacity decreased but the decreasing amount was slight and a charge reserve capacity of 1.5 Ah remained. As for the charge reserve capacity after six months in Embodiment 3, it was calculated as "11−6.5−3.0=1.5 (Ah)".

In the nickel-metal hydride storage battery 400 in Embodiment 4, contrary to Embodiments 1 to 3, the discharge reserve capacity decreased with time but a discharge reserve capacity of 1.5 Ah remained after six months. As for the charge reserve capacity after six months in Embodiment 4, it was calculated as "11−6.5−1.5=3.0 (Ah)".

As explained above, in the nickel-metal hydride batteries 100 to 400 in Embodiments 1 to 4, changes in discharge reserve and charge reserve of the negative electrode could be suppressed. This is because the hydrogen leak rate V1 (μl/h/Ah) was determined to meet the relationship: $2 \leq V1 \leq 14$ (concretely, V1=2.00, 3.66, 9.15, and 13.7). In another conceivable reason, the hydrogen leak rate V2 (μl/h/cm$^3$) was determined to satisfy the relationship: $0.2 \leq V1 \leq 1.8$ (concretely, V2=0.24, 0.44, 1.1, and 1.7). Specifically, since the hydrogen leak rates V1 and V2 were determined in the above ranges, a balance between the increasing amount of hydrogen in the battery resulting from corrosion of the hydrogen absorbing alloy of the negative electrode and the decreasing amount of hydrogen resulting from leakage of hydrogen gas to the outside of the battery could be kept.

Thus, the nickel-metal hydride storage battery arranged to determine the hydrogen leak rate V1 (μl/h/Ah) so as to satisfy the relationship: $2 \leq V1 \leq 14$ could suppress the lowering of battery characteristics for a long term. Alternatively, determining the hydrogen leak rate V2 (μl/h/cm$^3$) so as to satisfy the relationship: $0.2 \leq V2 \leq 1.8$ could suppress the lowering of battery characteristics for a long term.

In the nickel-metal hydride batteries 200 and 300 in Embodiments 2 and 3, particularly, changes in discharge reserve and charge reserve of the negative electrode could be suppressed. This is conceivably because the hydrogen leak rate V1 (μl/h/Ah) was determined to satisfy the relationship: $3.5 \leq V1 \leq 10$ (concretely, V1=3.66 and 9.15). In another conceivable reason, the hydrogen leak rate V2 (μl/h/cm$^3$) was determined to satisfy the relationship: $0.4 \leq V2 \leq 1.1$ (concretely, V2=0.44 and 1.1).

Specifically, when the hydrogen leak rate V1 (μl/h/Ah) is determined to meet the relationship: $3.5 \leq V1 \leq 10$, the lowering of battery characteristics can be suppressed for a longer term. Alternatively, when the hydrogen leak rate V2 (μl/h/cm$^3$) is determined to satisfy the relationship: $0.4 \leq V2 \leq 1.1$, the lowering of battery characteristics can be suppressed for a longer term.

Embodiment 5

The following explanation will be made on a nickel-metal hydride storage battery 500 in Embodiment 5, referring to FIGS. 7 and 8. The nickel-metal hydride storage battery 500 in Embodiment 5 corresponds to the nickel-metal hydride storage battery 700 in Comparative Embodiment 1 additionally including a hydrogen leakage device 503. In other words, the nickel-metal hydride storage battery 500 is configured such that the hydrogen leakage device 503 is additionally incorporated in the nickel-metal hydride storage battery provided with the conventional safety valve device 701. A sealing cover 520 in Embodiment 5 is formed with a gas release hole 522 through which the inside of a case 502 is communicated with the outside thereof as shown in FIG. 8.

Figure 7:
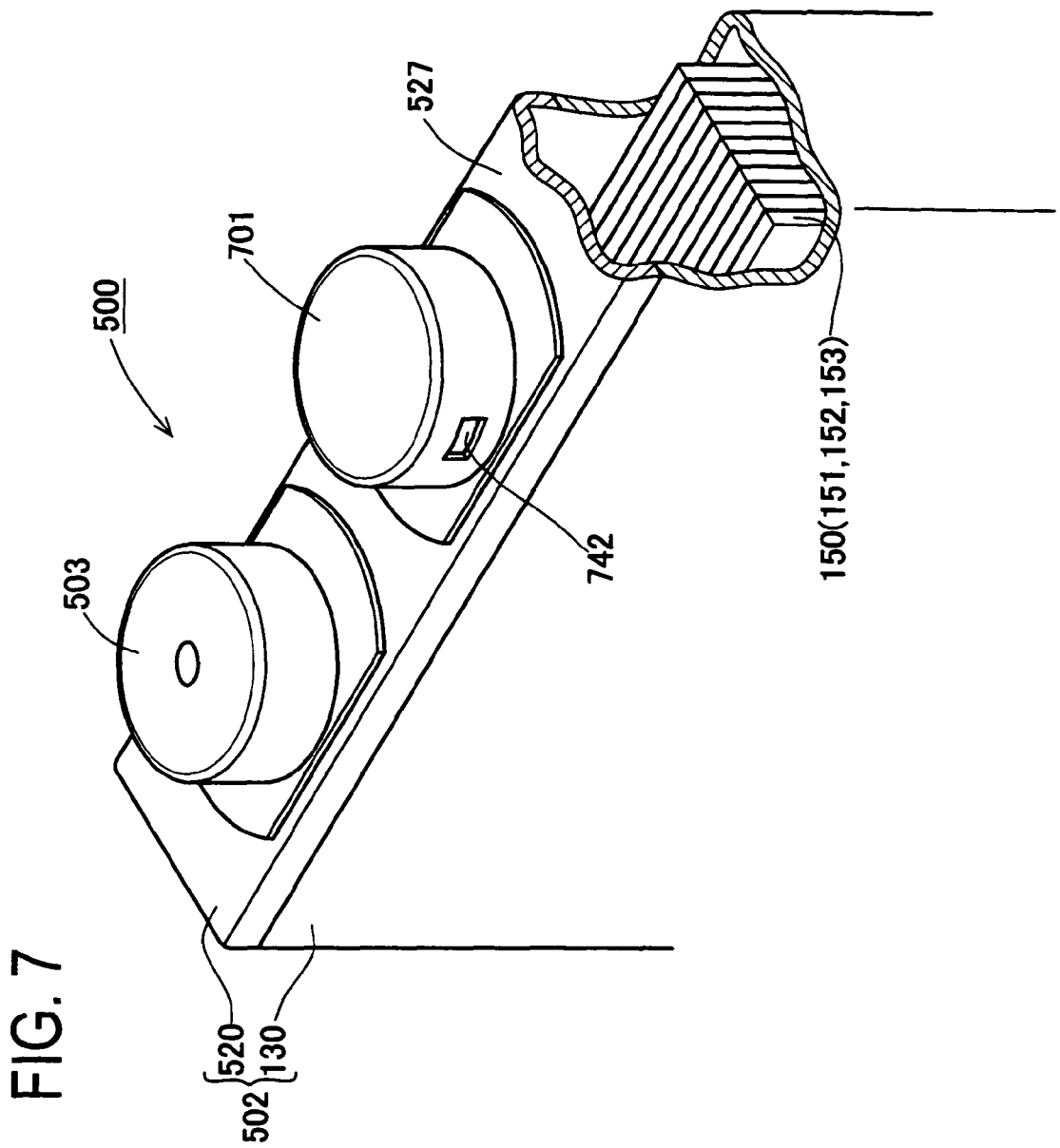
FIG. 7 is a partially cutaway perspective view of a nickel-metal hydride storage battery 500 in Embodiment 5.
Figure 8:
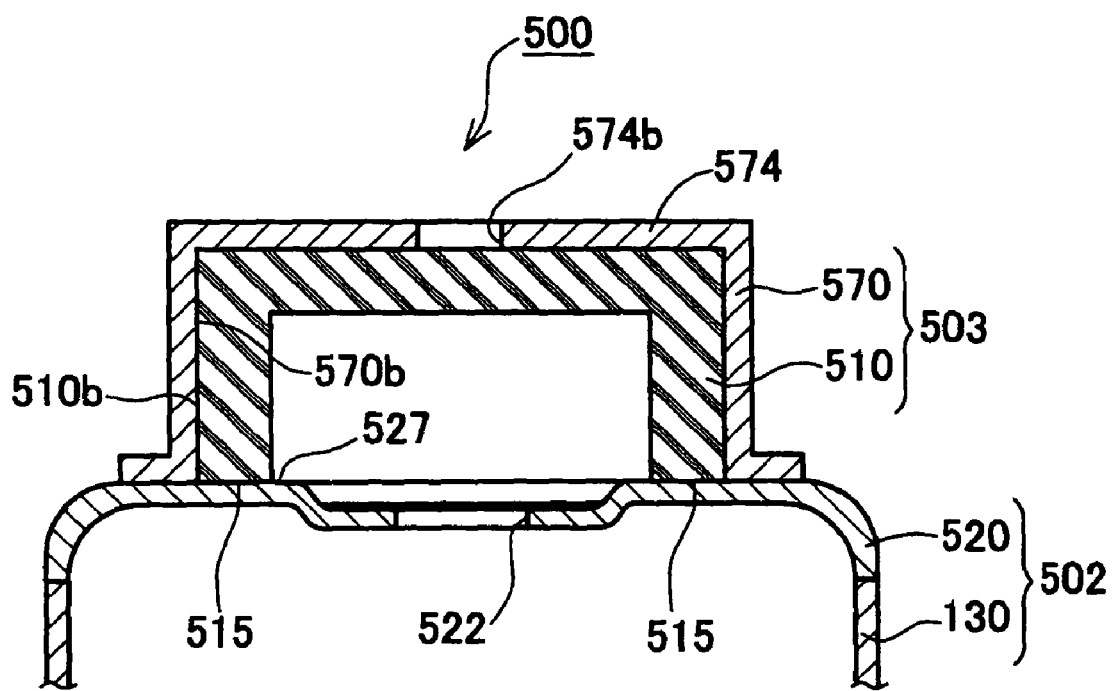
FIG. 8 is a longitudinal sectional view of a hydrogen leakage device 503 in Embodiment 5.

Referring to FIGS. 7 and 8, the hydrogen leakage device 503 is explained below. The hydrogen leakage device 503 is fixed side by side with the safety valve device 701 on an outer surface 527 of the sealing cover 520 (see FIG. 7). This hydrogen leakage device 503 includes a hydrogen permeable member 510 and a hydrogen leakage case 570 as shown in FIG. 8.

The hydrogen leakage case 570 is made of metal (specifically, a nickel-plated steel plate) formed in a closed-end, substantially cylindrical shape. This hydrogen leakage case 570 is formed with a through hole 574b in a top wall 574. This hydrogen leakage case 570 is fixed on the outer surface 527 of the sealing cover 520 by laser welding at a position where the case 570 is axially aligned with the gas release hole 522. The hydrogen permeable member 510 is made of hydrogen permeable rubber (specifically, EPDM) and has a closed-end, substantially cylindrical shape which conforms to an inner surface 570b of the hydrogen leakage case 570. This hydrogen permeable member 510 is fitted in the hydrogen leakage case 570 so that a sealing surface 515 is held in close contact with the outer surface 527 of the sealing cover 520.

The above hydrogen leakage device 503 also allows the hydrogen gas in the case 502 to leak out of the battery as with the safety valve devices 101 to 104 in Embodiments 1 to 4. To be more concrete, the hydrogen gas in the case 502 can be made to permeate through the wall of the hydrogen permeable member 510 and be released from the battery through between the hydrogen permeable member 510 and the hydrogen leakage case 570 and then through the through hole 574b of the top wall 574 of the hydrogen leakage case 570. Even in the nickel-metal hydride storage battery 500 in Embodiment 5, accordingly, the hydrogen permeable member 510 may be designed variously to have different thickness, shapes, etc. as in Embodiments 1 to 4 to provide the hydrogen leak rate V1 (μl/h/Ah) in the range of $3.5 \leq V1 \leq 10$ or the hydrogen leak rate V2 (μl/h/cm$^3$) in the range of $0.4 \leq V2 \leq 1.1$. This can suppress the lowering of battery characteristics for a long term.

Embodiment 6

The following explanation will be made on a nickel-metal hydride storage battery 600 in Embodiment 6, referring to FIGS. 9 to 13. The nickel-metal hydride storage battery 600 in Embodiment 6 is different in the structure of a safety valve device from Embodiments 1 to 4 and substantially similar thereto in other parts or components.

Figure 9:
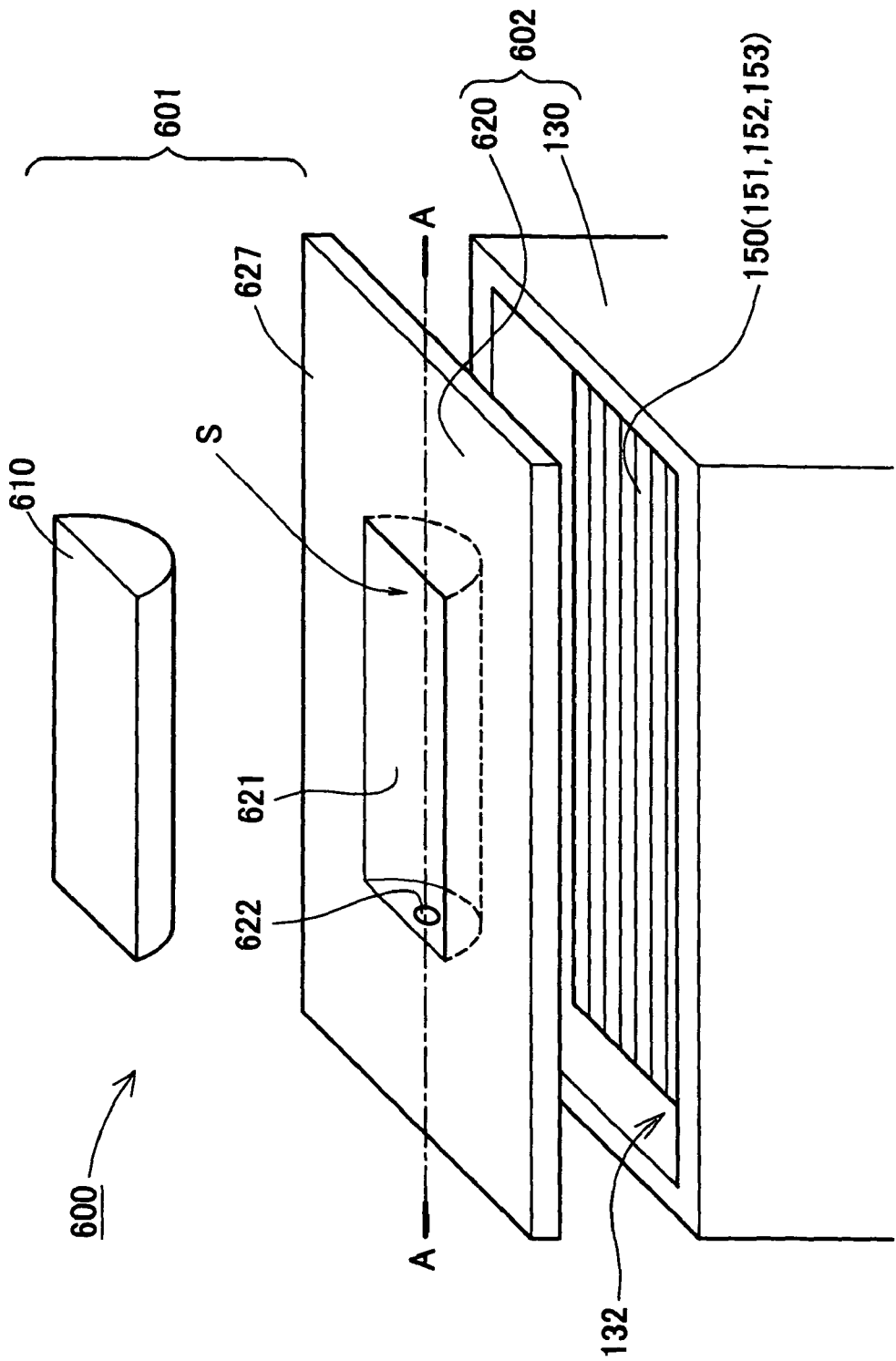
FIG. 9 is a partially cutaway perspective view of a nickel-metal hydride storage battery 600 in Embodiment 6.

The nickel-metal hydride storage battery 600 in Embodiment 6 has a case 602 including a sealing cover 620 and a battery casing 130, a valve member 610, and a retaining plate 640 as shown in FIG. 9. The sealing cover 620 has a recessed wall 621 providing a recess S formed inwardly toward the battery casing 130 relative to an outer surface 627. This recessed wall 621 is of a substantially semi-cylindrical shape, including a recessed bottom 625 as the bottom of the recessed wall 621, a first side wall 623 connecting the recessed bottom 625 and the outer surface 627, and a second side wall 624 connecting the recessed bottom 625 and the outer surface 627 and opposite to the first side wall 623.

Figure 10:
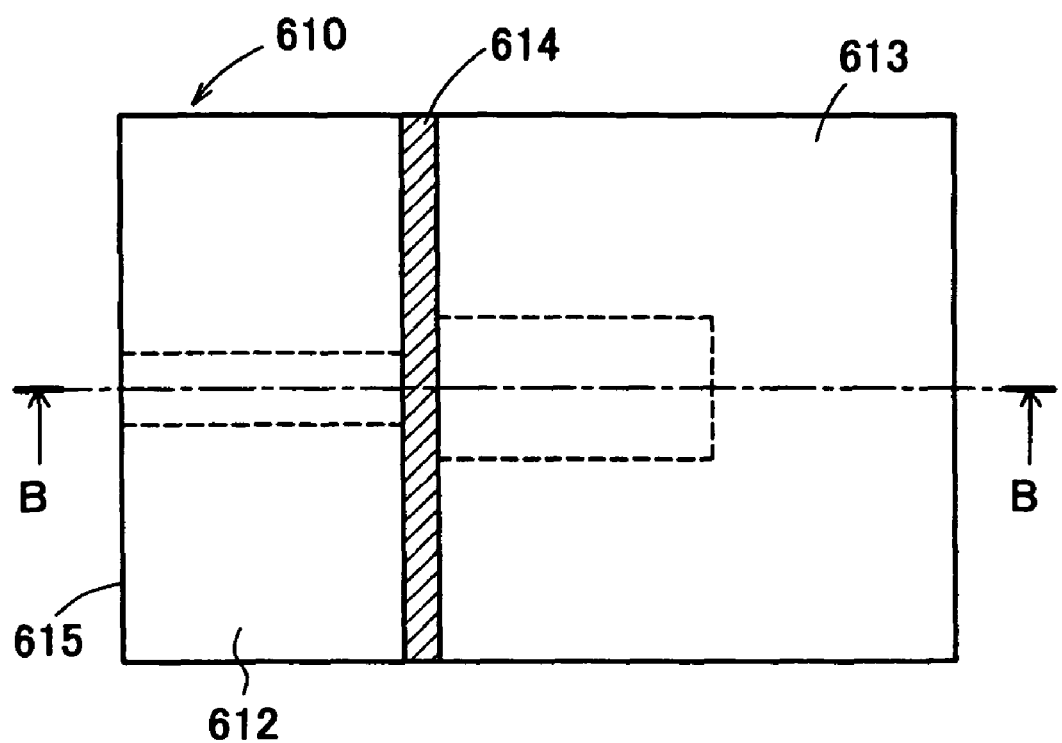
FIG. 10 is a top view of a valve member 610 in Embodiment 6.

The recessed bottom 625 is of a U-shaped (substantially semicircular) section taken along a direction perpendicular to a direction linking the first side wall 623 and the second side wall 624 (i.e. in a right-and-left direction in FIG. 10). The first side wall 623 is provided with a release hole 622 formed therethrough to communicate the inside of the case 602 to the outside thereof. The thus configured sealing cover 620 can be manufactured in such a manner that for example a metal plate of a predetermined size is press-molded to form the recessed wall 621 (the recess S) with the recessed bottom 625 having the U-shaped (almost semicircular) section, and the release hole 622 is pierced in the first side wall 623.

Figure 11:
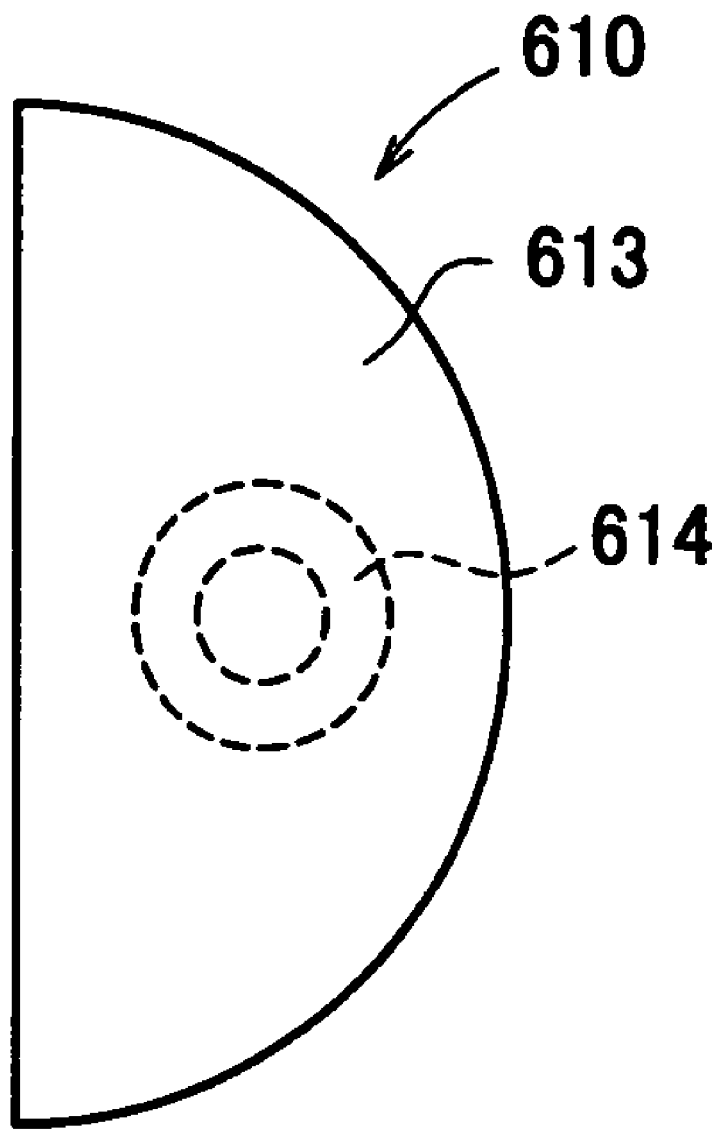
FIG. 11 is a front view of the valve member 610.
Figure 12:
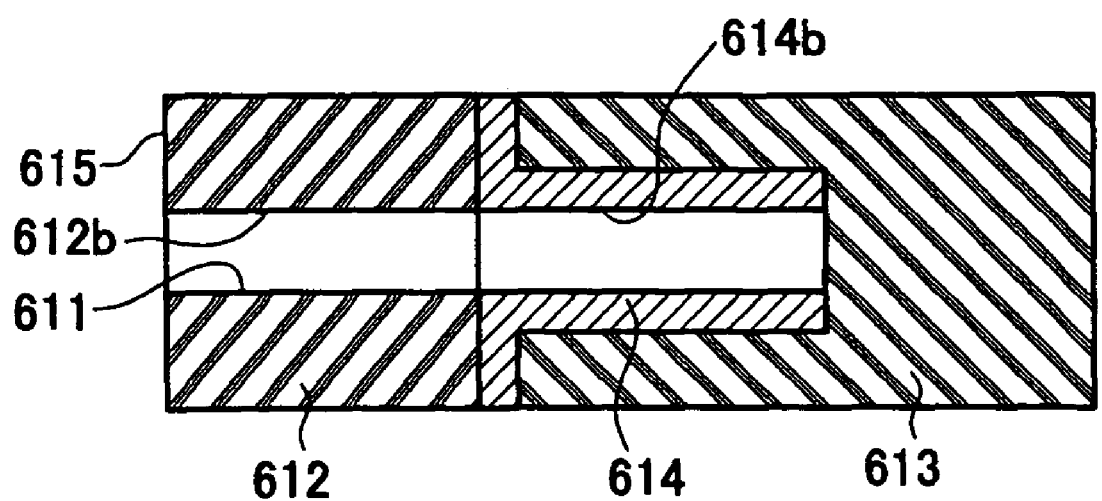
FIG. 12 is a sectional view of the valve element 610, taken along a line B-B of FIG. 10.

As shown in FIGS. 10 to 12, the valve member 610 is an integrally molded piece including a first valve element 612 made of rubber (specifically, EPDM) formed in a semi-column shape having a first through hole 612b, a second valve element 614 made of metal (specifically, a nickel-plated steel plate) formed with a second through hole 614b, and a third valve element 613 made of rubber (specifically, EPDM)

formed in a semi-column shape surrounding the second valve element 614. In other words, the valve member 610 in Embodiment 6 is a rubber molded piece produced by insert molding of the first valve element 612 and the third valve element 613 interposing the second valve element 614 therebetween.

Figure 13:
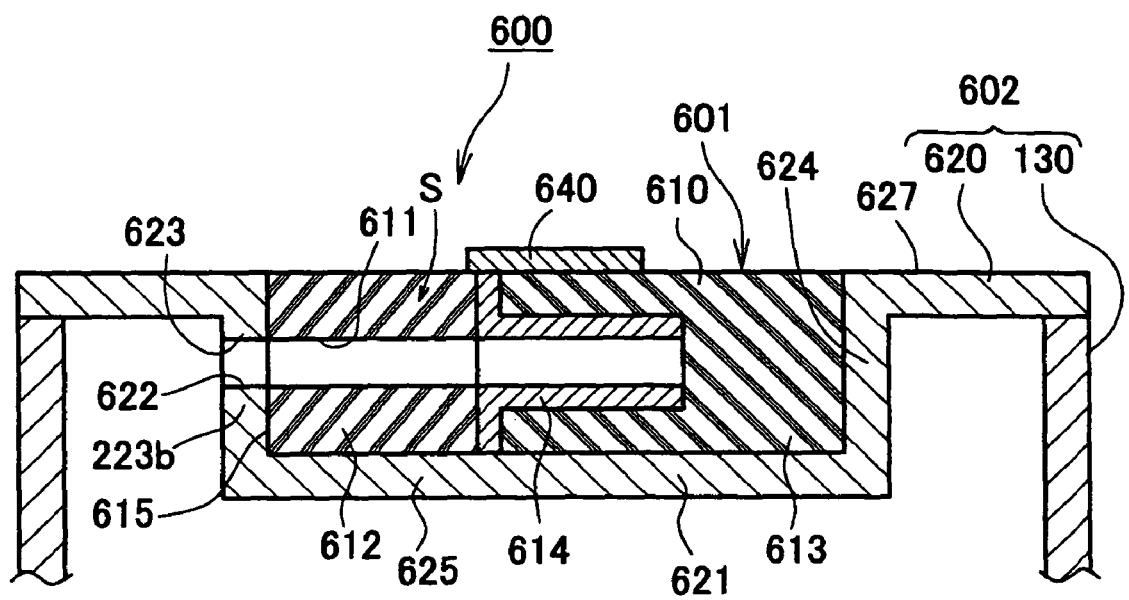
FIG. 13 is an explanatory sectional view of a safety valve device 601 in Embodiment 6, taken along a line A-A of FIG. 9.

This valve member 610 is mounted in the recess S of the sealing cover 620 as shown in FIG. 13 so that the valve member 610 is compressed in the right-and-left direction in FIG. 13. At this time, the first through hole 612b of the first valve element 612 and the second through hole 614b of the second valve element 614 form a through hole 611 communicated with the release hole 622. It is to be noted that the retaining plate 640 is fixed on (welded to) the outer surface 627 of the sealing cover 620. Accordingly, the valve member 610 can be prevented from dropping off the recess S.

In the nickel-metal hydride storage battery 600 in Embodiment 6, the valve member 610, the recessed wall 621 formed in the sealing cover 620, and the retaining plate 640 constitute a safety valve device 601.

Here, a valve opening operation of the safety valve device 601 is described. When the internal pressure in the case 602 is lower than a predetermined value, the annular sealing surface 615 is held in close contact with the first side wall 623 surrounding the release hole 622 while gas exists in the through hole 611 of the valve member 610. When the internal pressure in the case 602 exceeds the predetermined value, on the other hand, the rubber, third valve element 613 is pressed by the gas existing in the case 602 and the through hole 611 and elastically deformed rightwards in FIG. 10 into a compressed state. Accordingly, the second valve element 614 and the first valve element 612 are moved in a direction of separating from the first side wall 623 (i.e. in the right direction in FIG. 13), bringing the sealing surface 615 out of contact with the first side wall 623, thus generating a gap between the sealing surface 615 and the first side wall 623. In this state, the gas can be discharged from the case 602 appropriately.

In the meanwhile, the valve member 610 is arranged so that the rubber, first valve element 612 and the metallic, second valve element 614 are in contact with each other, while the rubber, third valve element 613 and the metallic, second valve element 614 are in contact with each other. The safety valve device 601 comprising such valve member 610 allows the hydrogen gas in the case 602 to leak out of the battery as with the safety valve devices 101 to 104 in Embodiments 1 to 4. Concretely, the hydrogen gas having flowed from the case 602 into the through hole 611 of the valve member 610 is further allowed to pass through the gaps between the rubber, first valve element 612 and the metallic, second valve element 614 and between the rubber, third valve element 613 and the metallic, second valve element 614 to leak out of the battery.

Even in the nickel-metal hydride storage battery 600 in Embodiment 6, accordingly, adjustment of the gap (contact strength) between the first and second valve elements 612 and 614 and the gap (contact strength) between the third and second valve elements 613 and 614 makes it possible to provide the hydrogen leak rate V1 ($\mu$l/h/Ah) in the range of $3.5 \leq V1 \leq 10$ or the hydrogen leak rate V2 ($\mu$l/h/cm$^3$) in a range of $0.4 \leq V2 \leq 1.1$. This makes it possible to suppress the lowering of battery characteristics for a long term.

Although the present invention are explained above in Embodiments 1 to 6, the present invention is not limited thereto but may be embodied in other specific forms without departing from the spirit or essential characteristics thereof.

For instance, the cases 102, 502, and 602 in Embodiments 1 to 6 are made of metal (only the metal wall), but they may be made of a combination of metal (a metal wall) and resin (a resin wall). However, it is preferable that the metal wall forming the outer surface of the case accounts for more than 90% of the total area of the outer surface of the case. Such case made of metal in more than 90% of the total outer surface can improve the cooling property of the battery, thus preventing excessive rise in temperature of the battery.

In Embodiments 1 to 3, the through hole 174b is formed in only the top wall 174 of the valve cap 170, but another through hole may be formed in the peripheral wall 172. This structure having the through hole in the peripheral wall 172 allows the hydrogen gas having permeated through the valve member 110, 210, or 310 to more easily leak out of the battery. This makes it possible to improve the hydrogen leak rates V1 and V2.

In Embodiment 5, furthermore, the hydrogen leakage device 503 is fixed on the outer surface 527 of the sealing cover 520 (see FIG. 7), side by side with the safety valve device 701. Alternatively, it may be placed at any position where it can be fixed to.

The invention claimed is:

1. A nickel-metal hydride storage battery comprising:
   a battery main part; and
   a case which houses the battery main part and forms a gas release hole through which gas in the case can be released from the case; and
   a safety valve device including further comprising:
   a valve member having a sealing surface, a flange, a top wall, and a cylindrical peripheral wall, the flange extending radially outward from a bottom portion of the cylindrical peripheral wall, the top wall and the cylindrical peripheral wall defining a space in-between the top wall and the case, and the valve member having a closed position wherein the sealing surface contacts a portion of the case around the gas release hole to close the hole, and an open position wherein when an inner pressure in the case exceeds a predetermined value, the sealing surface of the valve member separates from the portion around the hole to release gas from the case; and
   a valve cap having an outer peripheral wall and covering the valve member, and an aperture in the valve cap;
   wherein the valve member is made of a hydrogen gas permeable rubber, allowing hydrogen gas in the case to permeate through the valve member and leak out of the battery at a hydrogen leak rate V1 ($\mu$l/h/Ah) per unit of battery capacity when the sealing surface is in the closed position, and
   wherein the hydrogen leak rate V1 ($\mu$l/h/Ah) of the battery, which has been subjected to charging and discharging and then charged to 60% SOC, satisfies a relationship: $2 \leq V1 \leq 14$ under an atmosphere at a battery temperature of 45° C. and a reduced pressure of 10 kPa.

2. The nickel-metal hydride storage battery according to claim 1, wherein the hydrogen leak rate V1 ($\mu$l/h/Ah) satisfies a relationship: $3.5 \leq V1 \leq 10$.

3. A nickel-metal hydride storage battery comprising:
   a battery main part; and
   a case which houses the battery main part, wherein a gas release hole is defined in the case, through which gas can be released from the case; and
   a safety valve device further comprising:
   a hydrogen gas-permeable, rubber valve member having a sealing surface held in contact with a portion of the case around the gas release hole, a flange, a top wall, and a cylindrical peripheral wall, the flange extending radially outward from a bottom portion of the cylindrical peripheral wall, the top wall and the cylindrical peripheral wall defining a space in-between the top wall and the case, the sealing surface of the valve member contacting with the portion around the gas release hole to close the hole, and, when an inner pressure in the case exceeds a predetermined value the sealing surface of the valve member, separates from the portion around the hole to release gas from the case; and a valve cap having an outer peripheral wall and covering the valve member, and an aperture in the valve cap;

wherein the battery, after charging and discharging and being charged to 60% SOC, allows hydrogen gas in the case to permeate through the valve member and leak out of the battery at a hydrogen leak rate V2 ($\mu$l/h/cm$^3$) per unit of battery volume when the sealing surface is in the closed position, the hydrogen leak rate V2 satisfying a relationship: $0.2 \leq V2$ 1.8 under an atmosphere at a battery temperature of 45° C., and a reduced pressure of 10 kPa.

4. The nickel-metal hydride storage battery according to claim 3, wherein the hydrogen leak rate V2 ($\mu$l/h/cm$^3$) satisfies a relationship: $0.4 \leq V2 \leq 1.1$.

5. The nickel-metal hydride storage battery according to claim 1, wherein the case includes a metal wall defining an outer surface of the case, and an area of the metal wall defining the outer surface of the case exceeds 90% of a total area of the outer surface of the case.

6. The nickel-metal hydride storage battery according to claim 1, wherein the case is made of metal.

7. The nickel-metal hydride storage battery according to claim 3, wherein the case includes a metal wall defining an outer surface of the case, and an area of the metal wall defining the outer surface of the case exceeds 90% of a total area of the outer surface of the case.

8. The nickel-metal hydride storage battery according to claim 3, wherein the case is made of metal.

9. A nickel-metal hydride storage battery comprising:

a battery main part;

a case housing the battery main part, the case defining an aperture;

a safety valve provided on the case, the safety valve comprising a hydrogen-permeable, rubber valve member provided proximate the aperture to close the aperture, a flange, a top wall, and a cylindrical peripheral wall, the flange extending radially outward from a bottom portion of the cylindrical peripheral wall, the top wall and the cylindrical peripheral wall defining a space in-between the top wall and the case; and a valve cap having an outer peripheral wall and covering the valve member, and an aperture in the valve cap;

wherein when an internal pressure inside the battery case reaches a predetermined pressure, the safety valve opens to relieve the internal pressure via the aperture;

and wherein when the valve member closes the aperture, the battery is charged and discharged, and then charged to 60% SOC, the valve member permits permeation therethrough of a hydrogen leak rate V1 ($\mu$l/h/cm$^3$) per unit of battery capacity, satisfying a relationship $2 \leq V1 \leq 14$ under an atmosphere at a battery temperature of 45° C. and a pressure of 10 KPa.

10. The nickel-metal hydride storage battery according to claim 1, wherein the safety valve device further comprises a housing connected to an upper surface of the case, said housing having an upper surface, a side surface, and an aperture in at least the upper surface, wherein the aperture has a diameter greater than a diameter of the outer peripheral wall of the valve cap.

11. The nickel-metal hydride storage battery according to claim 3, wherein the safety valve device further comprises a housing connected to an upper surface of the case, said housing having an upper surface, a side surface, and an aperture in at least the upper surface, wherein the aperture has a diameter greater than a diameter of the outer peripheral wall of the valve cap.

12. The nickel-metal hydride storage battery according to claim 9, wherein the safety valve device further comprises a housing connected to an upper surface of the case, said housing having an upper surface, a side surface, and an aperture in at least the upper surface, wherein the aperture has a diameter greater than a diameter of the outer peripheral wall of the valve cap.

* * * * *

UNITED STATES PATENT AND TRADEMARK OFFICE
CERTIFICATE OF CORRECTION

| | | |
|---|---|---|
| PATENT NO. | : 7,758,994 B2 | Page 1 of 1 |
| APPLICATION NO. | : 11/629981 | |
| DATED | : July 20, 2010 | |
| INVENTOR(S) | : Katsunori Komori et al. | |

It is certified that error appears in the above-identified patent and that said Letters Patent is hereby corrected as shown below:

Claim 3, col. 21, line 15, "$0. \leqq 2 \text{ V2 } 1.8$" should read --$0.2 \leqq V2 \leqq 1.8$.--

Signed and Sealed this

Sixteenth Day of November, 2010

David J. Kappos
*Director of the United States Patent and Trademark Office*